United States Patent
Bush et al.

(10) Patent No.: US 10,284,294 B2
(45) Date of Patent: May 7, 2019

(54) RF INGRESS IN FIBER-TO-THE-PREMISES

(71) Applicant: VIAVI SOLUTIONS, INC., San Jose, CA (US)

(72) Inventors: Terry W. Bush, Greenwood, IN (US); Gary Sinde, Indianapolis, IN (US); Dan Dillon, Indianapolis, IN (US)

(73) Assignee: VIAVI SOLUTIONS, INC., San Jose, CA (US)

( * ) Notice: Subject to any disclaimer, the term of this patent is extended or adjusted under 35 U.S.C. 154(b) by 0 days.

(21) Appl. No.: 15/291,643

(22) Filed: Oct. 12, 2016

(65) Prior Publication Data

US 2017/0099100 A1    Apr. 6, 2017

Related U.S. Application Data

(63) Continuation-in-part of application No. 14/221,414, filed on Mar. 21, 2014, now Pat. No. 9,654,218.

(60) Provisional application No. 62/240,071, filed on Oct. 12, 2015, provisional application No. 61/813,205, filed on Apr. 18, 2013.

(51) Int. Cl.
| | |
|---|---|
| *H04B 10/2575* | (2013.01) |
| *H04Q 11/00* | (2006.01) |
| *H04B 10/079* | (2013.01) |
| *H04B 10/27* | (2013.01) |
| *H04J 14/02* | (2006.01) |

(52) U.S. Cl.
CPC ... *H04B 10/25751* (2013.01); *H04B 10/0793* (2013.01); *H04B 10/27* (2013.01); *H04J 14/0242* (2013.01); *H04Q 11/0005* (2013.01); *H04Q 11/0062* (2013.01); *H04Q 11/0071* (2013.01); *H04Q 2011/0015* (2013.01); *H04Q 2011/0039* (2013.01); *H04Q 2011/0083* (2013.01)

(58) Field of Classification Search
CPC .......... H04B 10/25751; H04B 10/0793; H04B 10/27; H04Q 11/0062; H04Q 11/0005; H04Q 11/0071; H04Q 2011/0039; H04Q 2011/0015; H04Q 2011/0083; H04J 14/0242
See application file for complete search history.

(56) References Cited

U.S. PATENT DOCUMENTS

| | | | |
|---|---|---|---|
| 8,849,122 B2 * | 9/2014 | Brooks | H04Q 11/0067 398/115 |
| 9,654,218 B2 | 5/2017 | Bush et al. | |
| 2002/0083476 A1 | 6/2002 | McNamara | |
| 2008/0292314 A1 | 11/2008 | Lu | |
| 2009/0047917 A1 | 2/2009 | Phillips et al. | |
| 2009/0113511 A1 * | 4/2009 | Lee | H04B 10/2507 725/129 |
| 2011/0283331 A1 | 11/2011 | Riggsby | |
| 2012/0044361 A1 | 2/2012 | Riggsby | |
| 2013/0125193 A1 | 5/2013 | Wells | |

(Continued)

*Primary Examiner* — Leslie C Pascal
(74) *Attorney, Agent, or Firm* — Barnes & Thornburg LLP

(57) ABSTRACT

An apparatus and method for monitoring an individual premise return band at the side of the home, in a pedestal TAP, or in an aerial TAP is disclosed. The apparatus may be configured to be connected one to eight homes to analyze the return band spectrum, communicate this spectrum to a server for storage and/or alarm, and/or take action when the spectrum exceeds predefined limits or based on instructions received from a server.

12 Claims, 16 Drawing Sheets

(56) References Cited

U.S. PATENT DOCUMENTS

2014/0033264 A1    1/2014   Li et al.
2014/0301490 A1   10/2014   Nielsen et al.
2015/0138960 A1    5/2015   Riggsby et al.

* cited by examiner

RF INGRESS IN FIBER-TO-THE-PREMISES

This application claims priority under 35 U.S.C. § 119 to U.S. Patent Application Ser. No. 62/240,071, which was filed on Oct. 12, 2015, and claims priority under 35 U.S.C. § 120 to U.S. patent application Ser. No. 14/221,414, filed Mar. 21, 2014, which claimed priority to U.S. Patent Application Ser. No. 61/813,205, which was filed on Apr. 18, 2013. The entirety of each of those applications is expressly incorporated herein by reference.

BACKGROUND

In hybrid fiber coax (hereinafter sometimes HFC) and RF over glass (hereinafter sometimes RFOG) CATV (hereinafter sometimes cable) plant designs, there is a forward path (from the cable company's transmission point to the subscriber's premises) and a return path (from the subscriber's premises back to the cable company's receiving point). The forward path is a trunk-to-branch topology wherein signals are split and split until they reach the subscriber's premises. In contrast, the return path is a combining branch-to-trunk where signals combine until they reach the cable headend. HFC is glass fiber from the headend to distribution points where it is converted to RF, and then RF amplifiers and stretches of coaxial cable to the subscriber's premises. RFOG is basically fiber optic cable to the subscriber, although at the subscriber's premises, the downstream-bound optical signal is converted to RF for decoding by the subscriber's display apparatus, computers, and the like, and, conversely, the upstream-bound signal is converted from RF to optical for transport.

Since subscribers' premises are not the property of the cable operator and signals from many subscriber's premises on a particular node combine in the return band, this section of the cable operator's plant is most subject to noise as every subscriber's premises acts like an antenna and noise accumulates, as in a funnel, until it reaches the cable headend.

Many systems have been designed to assist cable operators to monitor their return band frequency spectrum (for example, 5 to 42 MHz, 5 to 65 MHz, 5 to 85 MHz, or even 5 to 200 MHz) for noise. When noise above a certain threshold is detected, alarms are typically generated, and personnel are dispatched to repair the problem.

In an HFC network, technicians move from branch to branch looking for the noise, narrowing it down until the source is found. In an RFOG network, technicians must go directly to each subscriber's premises individually to search for noise problems. The reason for this is that RFOG has fiber optic cable all the way to the subscriber's premises. There is no RF signal to test except at the subscriber's premises. This makes finding noise problems originating at subscriber's premises somewhat more time consuming and expensive in RFOG architectures.

SUMMARY

At the subscriber's premises, the RFOG is converted back to RF using a so-called RF micronode or optical networking unit (hereinafter collectively sometimes ONU). According to one aspect of the disclosure, adjuncts functioning with the ONU can assist in making the search for noise sources in RFOG architectures less difficult.

An on-premise intelligent ingress test module monitors the noise generated by a subscriber's premises. The on-premise intelligent ingress test module acts to reduce or remove noise without CATV system or operator intervention.

The on-premise intelligent ingress test module is initially configured by server software (such as a module of Trilithic ViewPoint™ software). Once configured, the module can: (1) monitor the noise coming out of a subscriber's premises (by monitoring the return band spectrum); (2) enable an attenuator to reduce the noise coming out of the subscriber's premises; (3) disconnect the return band from the subscriber's premises thus cutting all noise; or even (4) power down the ONU, thus taking the subscriber's premises offline.

Furthermore, timers can be built into the module to provide time for self-healing. The module can monitor the noise coming from the subscriber's premises. When the noise has subsided, the module can reconnect the return path or remove the attenuation. This feature is provided because some subscriber's premises emit noise only at certain times, for example, when certain power tools or other devices are operated, making troubleshooting difficult.

Any time the module takes action, the module reports to the server software. With this feature, there is available to the CATV system operator a history of every subscriber's premises showing when subscribers' premises are causing network problems. Technicians can then be dispatched with efficiency.

In an added feature, a module can send periodic return band spectrum scans to the server so that trending data can be analyzed. Preventative measures can be taken based upon this trending data.

In another added feature, the entire return band would be passed through the device. This would permit the module not only to monitor the noise coming from the subscriber's premises but to filter and remove the noise before it reaches the network.

According to another aspect of the disclosure, a dual fiber optical network unit (ONU) apparatus is disclosed. The apparatus comprises a downstream path including a fiber input port, an optical-to-RF converter/optical receiver, a number of diplex filters, each diplex filter having an upper passband and a lower passband, and a number of RF input/output ports. The apparatus also comprises an upstream or return path including the number of RF input/output ports, the lower passband of the diplex filter, an n-input combiner, a return path RF-to-optical converter and optical transmitter, and a fiber output port. The apparatus further has an n-way RF splitter including an input port coupled to an output port of the optical-to-RF converter/optical receiver and a number of output ports, each output port being coupled to the upper passband of a respective diplex filter, and a control circuit operable to monitor signals in the upstream path. The lower passband of each diplex filter is coupled to a respective RF input/output port of the number of RF input/output ports and an input port of the n-input combiner. In some embodiments, n is an integer equal to the number of RF input/output ports.

In some embodiments, the apparatus may further comprise a number of switched attenuators. Each switched attenuator may have an input port coupled to the lower passband of a respective diplex filter and an output port coupled to an input port of the n-input combiner. Additionally, in some embodiments, the apparatus may comprise a number of switches. Each switch may have an input port coupled to an output port of a respective switched attenuator and an output port coupled to an input port of the n-input combiner.

In some embodiments, the control circuit may include a Field Programmable Gate Array (FPGA) configured to receive and digitize instructions via an input port of the dual fiber optical network unit apparatus. The FPGA may be configured to control the number of switched attenuators and the number of switches are coupled to the FPGA based on signals received from a cable signal source.

In some embodiments, the apparatus may further comprise a directional coupler having an input port coupled to an output port of the n-way combiner and an output port at which the amplitude of the signal at the output port of the n-way combiner can be measured.

In some embodiments, the apparatus may further comprise an n-way switch. An output terminal of each directional coupler may be coupled to a respective input port of the n-way switch. The control circuit may include an A/D converter having an input port coupled to an output port of the n-way switch and an FPGA having an input port coupled to an output port of the A/D converter.

According to another aspect of the disclosure, in a communication network, a node at a subscriber premises includes an input/output (I/O) port and a device for monitoring a subscriber premises. The device includes an upstream signal path including a first switch, a downstream signal path, and a controller having an input/output (I/O) port coupled to the I/O port of the node, and a first output port. The first switch is coupled to the first output port selectively to complete the upstream signal path.

Illustratively according to this aspect, the device further includes an attenuator. The first switch controls whether the attenuator is in the upstream signal path or not.

Illustratively according to this aspect, the controller includes a processor having an input port coupled in the upstream signal path to monitor the upstream signal path.

Further illustratively according to this aspect, the apparatus includes an analog-to-digital converter (A/D) coupled between the upstream signal path and the input port of the processor to A/D convert the signal in the upstream signal path for processing by the processor.

Illustratively according to this aspect, the processor comprises a filter for filtering noise from the signal in the upstream signal path.

Further illustratively according to this aspect, the apparatus comprises a digital-to-analog converter (D/A) coupled between the I/O port of the controller and the I/O port of the node.

Illustratively according to this aspect, the controller includes a processor having an input port. The apparatus further includes an analog-to-digital converter (A/D) coupled between the downstream signal path and the input port of the processor to A/D convert the signal in the downstream signal path for processing by the processor.

Further illustratively according to this aspect, the apparatus includes a bandpass filter coupled between the downstream signal path and the second A/D.

Further illustratively according to this aspect, the downstream signal path includes a second switch. The controller includes a second output port. The second switch is coupled to the second output port selectively to complete the downstream signal path.

Illustratively according to this aspect, the controller comprises a controller providing two-way communication with the network.

Illustratively according to this aspect, the upstream signal path comprises a lowpass filter having a passband of $\geq 5$ MHz and $\leq 200$ MHz.

Illustratively according to this aspect, the downstream signal path comprises a highpass filter having a passband of $\geq 50$ MHz and $\leq 1.8$ GHz.

Further illustratively according to this aspect, the apparatus includes a switchable attenuator in the upstream signal path. The switchable attenuator is coupled to the controller and is switchable via the controller under control of switching signals from the network.

Further illustratively according to this aspect, the apparatus includes a power inserter for supplying power to the node and the controller, and circuit components for isolating the upstream signal path and the downstream signal path from the power inserter.

Further illustratively according to this aspect, the apparatus includes a power control circuit controlling a third switch. The power control circuit and the third switch are under the control of switching signals from the network to control the node.

Further illustratively according to this aspect, the apparatus includes a pushbutton switch to reset the circuit and third switch, restoring the power supply to the node.

Illustratively according to this aspect, the node comprises a fiberoptic-to-RF/RF-to-fiberoptic node.

Alternatively illustratively according to this aspect, the node comprises a node of a hybrid fiber coaxial (HFC) communication network.

According to another aspect of the disclosure, a device permits a CATV network to perform at least one of the following functions with respect to a CATV subscriber: attenuate the CATV subscriber's return band; deactivate the CATV subscriber's premises' return band; deactivate the CATV subscriber's premises' forward band; and, deactivate the CATV subscriber's premises' network access.

According to an aspect of the disclosure, a dual fiber optical network unit (ONU) includes a downstream path and an upstream or return path. The downstream path includes a fiber input port, an optical-to-RF converter/optical receiver, a diplex filter having an upper passband and a lower passband, and an RF input/output port. The upstream or return path includes the RF input/output port, the lower passband of the diplex filter, a return path RF-to-optical converter and optical transmitter, and a fiber output port.

According to another aspect of the disclosure, a single fiber ONU includes a downstream path and an upstream or return path. The downstream path includes a fiber input/output port, a wavelength division multiplex (WDM) splitter/combiner, a wavelength division multiplexer (WDM), an optical-to-RF converter/optical receiver, a diplex filter having an upper passband and a lower passband, and an RF input/output port. The upstream or return path includes the RF input/output port, the lower passband of the diplex filter, a return path RF-to-optical converter and optical transmitter and the optical fiber connector.

Further illustratively according to these aspects, the apparatus comprises an n-way RF splitter, n an integer. The diplex filter comprises n respective diplex filters. An output port of the optical-to-RF converter/optical receiver is coupled to an input port of the n-way RF splitter. The n output ports of the n-way RF splitter are coupled to the upper passbands of the respective diplex filters. The RF input/output port comprises n respective RF input/output ports. The input/output ports of the respective diplex filters are coupled to respective RF input/output ports. The apparatus further comprises an n-input combiner. The lower passbands of the respective diplex filters are coupled to respective input ports of the n-input combiner.

Further illustratively according to these aspects, the apparatus comprises n RF input/output ports, n an integer, and n directional couplers. An input port of each directional coupler is coupled to a respective RF input/output port. The apparatus further comprises n switched attenuators. An output port of each directional coupler is coupled to an input port of a respective switched attenuator. The apparatus further comprises an n n-way combiner. An output port of each switched attenuator is coupled to a respective input port of the n-way combiner. An output port of the n-way combiner is coupled to the return path RF-to-optical converter and optical transmitter.

Further illustratively according to these aspects, the apparatus comprises n RF input/output ports, n an integer, and n directional couplers. An input port of each directional coupler is coupled to a respective RF input/output port. The apparatus further comprises n switches. An output port of each directional coupler is coupled to an input port of a respective switch. The apparatus further comprises an n-way combiner. An output port of each switch is coupled to a respective input port of the n-way combiner. An output port of the n-way combiner is coupled to the return path RF-to-optical converter and optical transmitter.

Further illustratively according to these aspects, the apparatus comprises n RF input/output ports, n an integer, and n directional couplers. An input port of each directional coupler is coupled to a respective RF input/output port. The apparatus further comprises n switched attenuators. An output port of each directional coupler is coupled to a respective switched attenuator. The apparatus further comprises n switches. Each switched attenuator is coupled to a respective switch. The apparatus further comprises an n-way combiner. Each switch is coupled to a respective input port of the n-way combiner. An output port of the n-way combiner is coupled to the return path RF-to-optical converter and optical transmitter.

Further illustratively according to these aspects, the apparatus comprises a Field Programmable Gate Array (FPGA) coupled to the fiber input port to receive and digitize instructions. The n switched attenuators and the n switches are coupled to the FPGA to control the n switched attenuators and the n switches.

Further illustratively according to these aspects, the apparatus comprises a directional coupler having an input port coupled to an output port of the n-way combiner and an output port at which the amplitude of the signal at the output port of the n-way combiner can be measured.

Further illustratively according to these aspects, the apparatus comprises an n-way switch and an A/D converter. An output terminal of each directional coupler is coupled to a respective input port of the n-way switch. An output port of the n-way switch is coupled to an input port of the A/D converter. An output port of the A/D converter is coupled to an input port of the FPGA.

Further illustratively according to these aspects, the apparatus comprises a Field Programmable Gate Array (FPGA) and an A/D converter. An output port of the optical-to-RF converter/optical receiver is coupled to an input port of the A/D converter. An output port of the A/D converter is coupled to an input port of the FPGA to provide to the forward spectral power levels and instructions from the head end.

Further illustratively according to these aspects, the apparatus comprises a Wavelength Division Multiplexer (WDM) coupled to the fiber input port. A Passive Optical Network (PON) is coupled to the WDM for monitoring of the status of the ONU and subscriber equipment coupled to the RF input/output port.

Further illustratively according to these aspects, the apparatus comprises a Field Programmable Gate Array (FPGA), an RF switch and an Ethernet interface switch. The RF switch has a port coupled to the RF input/output port, a port coupled to the return path RF-to-optical converter and optical transmitter, and a port coupled to the Ethernet interface switch. The Ethernet interface switch has a port coupled to the FPGA. The RF switch is actuable alternately to provide signals from the RF input/output port to the return path RF-to-optical converter and optical transmitter or to the FPGA.

Further illustratively according to these aspects, the apparatus comprises a directional coupler/testpoint tap having an input terminal coupled to the equalizer, a first output terminal coupled to the diplex filter, and a second output terminal coupled to a port at which the amplitude of the signal at the output port of the equalizer can be measured.

Further illustratively according to these aspects, the apparatus comprises a directional coupler having an input port coupled to the lower passband of the diplex filter, a first output port coupled to the return path RF-to-optical converter and optical transmitter, and a second output port coupled to a port at which the amplitude of the signal at the output port of the lower passband of the diplex filter can be measured.

Further illustratively according to these aspects, the apparatus comprises a directional coupler having an input port coupled to the lower passband of the diplex filter, a first output port coupled to the return path RF-to-optical converter and optical transmitter and a second output port coupled to an input port of a burst circuit which compares the signal from the directional coupler to a threshold, enabling the return path optical transmitter when the signal from the directional coupler reaches or exceeds the threshold, in order to pass data upstream from a subscriber coupled to the RF input/output port.

Further illustratively according to these aspects, the apparatus comprises a connector, for supplying power to the ONU.

Further illustratively according to these aspects, the apparatus comprises an automatic gain control (AGC) circuit for coupling an output port of the optical-to-RF converter/optical receiver to an input port of the diplex filter.

Further illustratively according to these aspects, the AGC circuit includes an output port coupled to a Central Processing Unit (CPU). A signal at the AGC circuit output port is processed by the CPU to control the RF output amplitude of the optical-to-RF converter/optical receiver.

Further illustratively according to these aspects, the apparatus comprises an equalizer for coupling an output port of the optical-to-RF converter/optical receiver to an input port of the diplex filter.

BRIEF DESCRIPTION OF THE DRAWINGS

The invention may best be understood by referring to the following detailed description and accompanying drawings. In the drawings.

DETAILED DESCRIPTIONS OF ILLUSTRATIVE EMBODIMENTS

Figure 1:
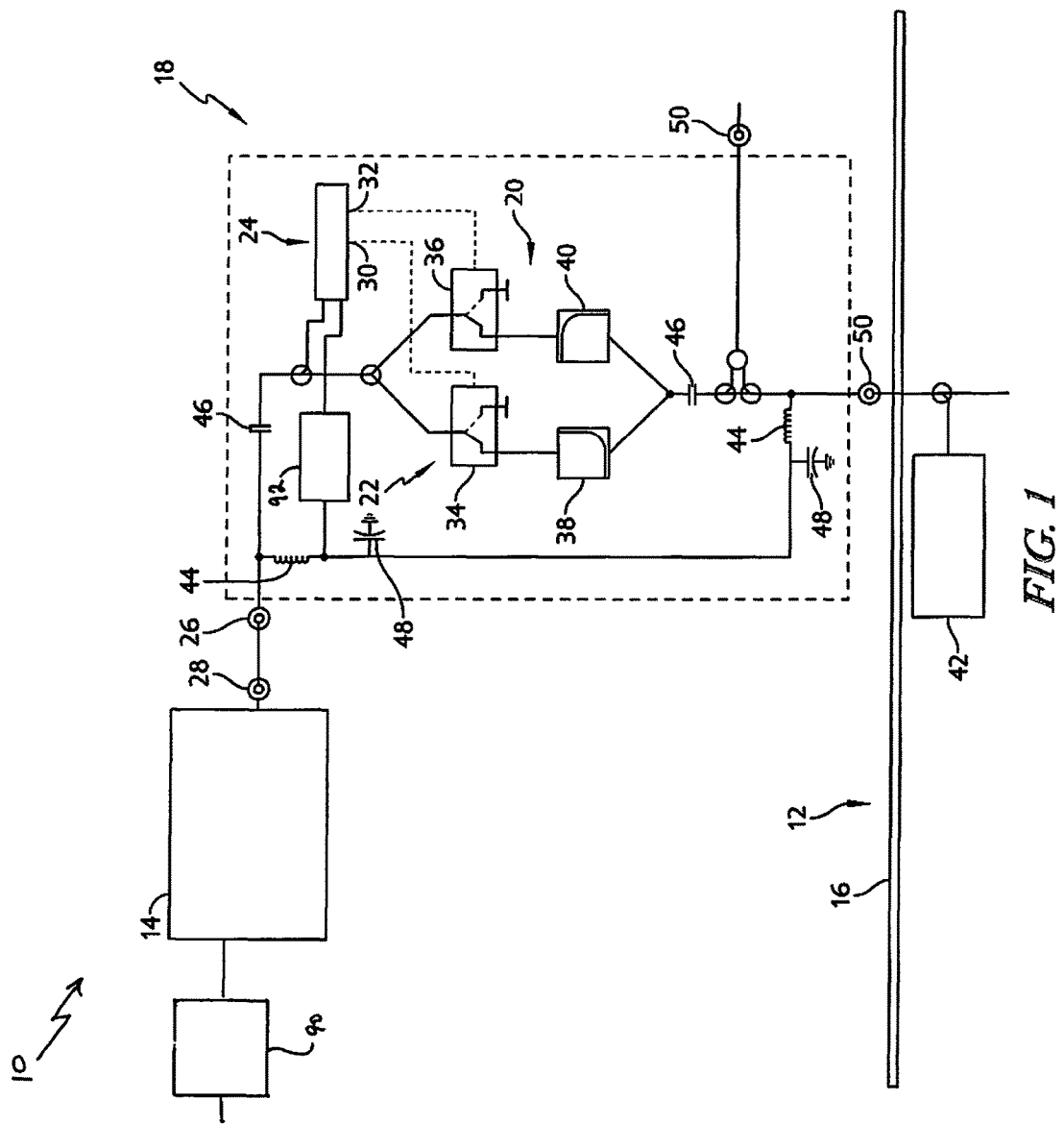
FIG. 1 illustrates a partly block and partly schematic drawing of an embodiment of the disclosure.

In optical fiber-to-subscriber communication networks 10, such as, for example, combined CATV/InternetNOIP systems, coupling to individual devices in the subscriber premises 12 is achieved by RF. RF transceivers on each device in the subscriber premises 12 receive downstream-bound traffic from, and transmit upstream-bound traffic to, a fiberoptic-to-RF/RF-to-fiberoptic node 14 which may be mounted, for example, on an outside wall 16 of the subscriber premises 12. Such a node 14 could be, for example, an AllOptic MicroNode™ optical network unit (ONU). Of concern in such situations is that the subscriber premises 12, a home, for example, may be an "RF-noisy" environment, which, of course, may interfere with both downstream-bound and upstream-bound communication. As these signals are combined for return upstream, all attached nodes, for example, 32 nodes, are affected by these noisy signals.

A device 18 for monitoring a subscriber premises 12 includes a diplex filter 20, a switching device 22 and a decoder 24. An input/output (I/O) port 26 of the decoder 24 is coupled to an I/O port 28 of the node 14 to receive and decode switching signals from the network 10, for example, a CATV/Internet/VOIP network 10. Output ports 30, 32 of the decoder 24 operate switches 34, 36, respectively, in the switching device 22 to disconnect either the upstream bound output from a lowpass filter 38 in the diplex filter 20, or the downstream bound input to a highpass filter 40 in the diplex filter 20, or both. The passband of filter 38 may be, for example 5 MHz-42 MHz, 5 MHz-65 MHz, or 5 MHz-85 MHz. The passband of filter 40 may be, for example, 50 MHz-1.8 GHz, 80 MHz-1.8 GHz or 110 MHz-1.8 GHz.

The decoder 24 can then be signaled to close the switch (es) 34 and/or 36, reconnecting the subscriber's premises 12 to the network 10. This can be done from the headend, cable signal source, or other suitable location 90 sequentially from subscriber node 14 to subscriber node 14 by providing control signals to the subscriber nodes 14s' decoders 24. In this way, subscriber premises 12 can be disconnected from the network 10 one at a time to assist in determining the source(s) of RF noise in the system. As each premises 12 is disconnected, technicians at the head end 90 may analyze the upstream signals received from the other parts of the network 10 to determine which premises 12 is the source of the RF noise. This (these) RF noise source(s) can then be addressed by (a) service technician(s).

The illustrated switches 34, 36 are RF single pole double throw switches. The output port of each switch which is not coupled to the diplex filter 20 may need to be terminated in a dummy load. Power for the illustrated system may be provided from a power inserter 42 through series inductors 44 to the node 14, the decoder 24 via the power supply 92, and other circuitry requiring power. Capacitors 46 keep the power off the RF signal path. Capacitors 48 reduce ripple and store charge. One or more test points 50 may be provided for monitoring signal flow in one or the other direction, or both.

In another embodiment, a device 118 for monitoring a subscriber premises 112 includes a diplex filter 120, a switching device 122 and a decoder 124. Decoder 124 provides two-way communication with network 110, facilitating, for example, a command/acknowledge architecture or format. An I/O port 126 of the decoder 124 is coupled to an I/O port 128 of the node 114 to receive and decode switching signals from the network 110, again, for example, a CATV/InternetNOIP network. Output ports 130, 132 of the decoder 124 operate switches 134, 136, respectively, in the switching device 122 to disconnect either the upstream-bound output from a lowpass filter 138 in the diplex filter 120, or the downstream-bound input to a highpass filter 140 in the diplex filter 120, or both. The passband of filter 138 may be, for example 5 MHz-42 MHz, 5 MHz-65 MHz, or 5 MHz-200 MHz. The passband of filter 140 may be, for example, 50 MHz-1.8 GHz, 80 MHz-1.8 GHz or 110 MHz-1.8 GHz. In this embodiment, the return band path includes a switchable attenuator 141, for example, a 6 dB switchable attenuator, switchable via the decoder 124 under control of switching signals from the network 110.

The decoder 124 can then be signaled to close the switch(es) 134 and/or 136, reconnecting the subscriber's premises 112 to the network 110. This can be done from the headend or other suitable location 190 sequentially from subscriber node 114 to subscriber node 114 by providing control signals to the subscriber nodes 114s' decoders 124. In this way, subscriber premises 112 can be disconnected from the network 110 one at a time to assist in determining the source(s) of RF noise in the system. As each premises 112 is disconnected, technicians at the head end 190 may analyze the upstream signals received from the other parts of the network 110 to determine which premises 112 is the source of the RF noise. This (these) RF noise source(s) can then be addressed by (a) service technician(s).

The illustrated switches 134, 136 are RF single pole double throw switches. The output port of each switch which is not coupled to the diplex filter 120 may need to be terminated in a dummy load. Power is provided from a power inserter 142 through series inductors 144 to the node 114, the decoder 124 via the power supply 192, and other circuitry requiring power. Power control to deactivate and reactivate the ONU is provided from a circuit 145, here, a one-shot, controlling a switch 147. Circuit 145 and thus switch 147 are under the control of switching signals from the network 110 via decoder 124. Device 118 also includes a pushbutton switch 149 to reset circuit 145 and switch 147, restoring the power supply to node 114. Capacitors 146 keep the power from the RF signal path. Capacitors 148 reduce ripple and store charge. One or more test points 150 may be provided for monitoring signal flow in one or the other direction, or both.

In another embodiment, a device 218 for monitoring a subscriber premises 212 includes two diplex filters 220-1, 220-2, a switching device 222 and an on-premise intelligent ingress test module (hereinafter sometimes module) 224.

Module 224 will be explained in more detail below. An I/O port 226 of module 224 is coupled to an I/O port 228 of the node 214 to receive and decode switching signals from the network 210, again, for example, a CATV/InternetNOIP network. Output port 230 of module 224 operates switch 234 in the switching device 222 to disconnect the upstream bound output from a lowpass filter 238-1 in a diplex filter 220-1. The passbands of return, or upstream, band filters 238-1, 238-2 in diplex filters 220-1, 220-2 may be, for example 5 MHz-42 MHz, 5 MHz-65 MHz, 5 MHz-85 MHz or 5 MHz-200 MHz. The passbands of downstream band filters 240-1, 240-2 in diplex filters 220-1, 220-2 may be, for example, 50 MHz-1.8 GHz, 80 MHz-1.8 GHz, 110 MHz-1.8 GHz or 220 MHz-1.8 GHz. In this embodiment, the return band path includes a switchable attenuator 241, for example, a 6 dB switchable attenuator, switchable via module 224.

Module 224 can be controlled by switching signals from the network 210 to close the switch 234, reconnecting the subscriber's premises 212 to the network 210. This can be done from the headend, cable signal source, or other suitable location 290 sequentially from subscriber node 214 to subscriber node 214 by providing control signals to the subscriber nodes 214s' on-premise intelligent ingress test module 224. In this way, subscriber premises 212 can be disconnected from the network 210 one at a time to assist in determining the source(s) of RF noise in the system. As each premises 212 is disconnected, technicians at the head end 290 may analyze the upstream signals received from the other parts of the network 210 to determine which premises 212 is the source of the RF noise. This (these) RF noise source(s) can then be addressed by (a) service technician(s).

Module 224 also has "smart" capability. That is, module 224 monitors the noise generated by subscriber's premises 212. The module 224 acts to reduce, via attenuator 241, or remove, via switch 234, noise without CATV system or operator intervention. Module 224 is initially configured by server software (such as a module of Trilithic ViewPoint™ software). Once configured, the module 224 can: (1) monitor the noise coming out of a subscriber's premises 212 (by monitoring the return band spectrum); (2) enable the attenuator 241 to reduce the noise coming out of the subscriber's premises 212; (3) disconnect, via switch 234, the return band from the subscriber's premises 212, thus cutting all noise; or even (4) power down the ONU, thus taking the subscriber's premises 212 offline.

Module 224 includes a field-programmable gate array (FPGA) 260 for signal processing, and an analog-to-digital (A/D) converter 262 for providing to FPGA 260 upstream-bound content from a tap 264 on an output port 266 of lowpass filter 238-1. Module 224 also includes an A/D 268 for providing bandpass 270 filtered downstream-bound content from a tap 272 on an output port 274 of highpass filter 240-2. Bandpass filter 270 has a passband of, for example, 80 MHz-100 MHz, 100 MHz-120 MHz, or the like. Bandpass filter 270 reduces the performance requirement on A/D 268, permitting a less expensive A/D to be used in this position. Digital output from a digital-to-analog (D/A) converter 276 coupled to an output port 280 of FPGA 260 is inserted into the upstream by a combiner 282. Switch 234 and attenuator 241 are controlled by outputs from module 224.

Timers can be built into module 224 to provide time for self-healing. Module 224 can monitor the noise coming from the subscriber's premises 212. This feature is provided because some subscribers' premises 212 are noisy only at certain times, for example, when certain power tools or other devices are operated, making troubleshooting difficult. When the noise has subsided, module 224 can operate the switch 234 to reconnect the return path or remove the attenuation 241.

Any time module 224 takes action, module 224 reports to the server software the action module 224 has taken. With this feature, a history of every device 218—equipped subscriber's premises 212 showing when subscribers' premises 212 have caused network problems, is available to the CATV system operator. This history assists in dispatching technicians efficiently.

As an optional feature, module 224 can send periodic return band spectrum scans to the server so that data can be analyzed for trends. Preventative measures can be taken based upon this trending data.

As another optional feature, the entire return band may be passed through module 224. Module 224 would then not monitor the noise coming from the subscriber's premises 212, but rather would filter the return band and remove the noise before the noise reaches the upstream path in the network 210.

Figure 2:
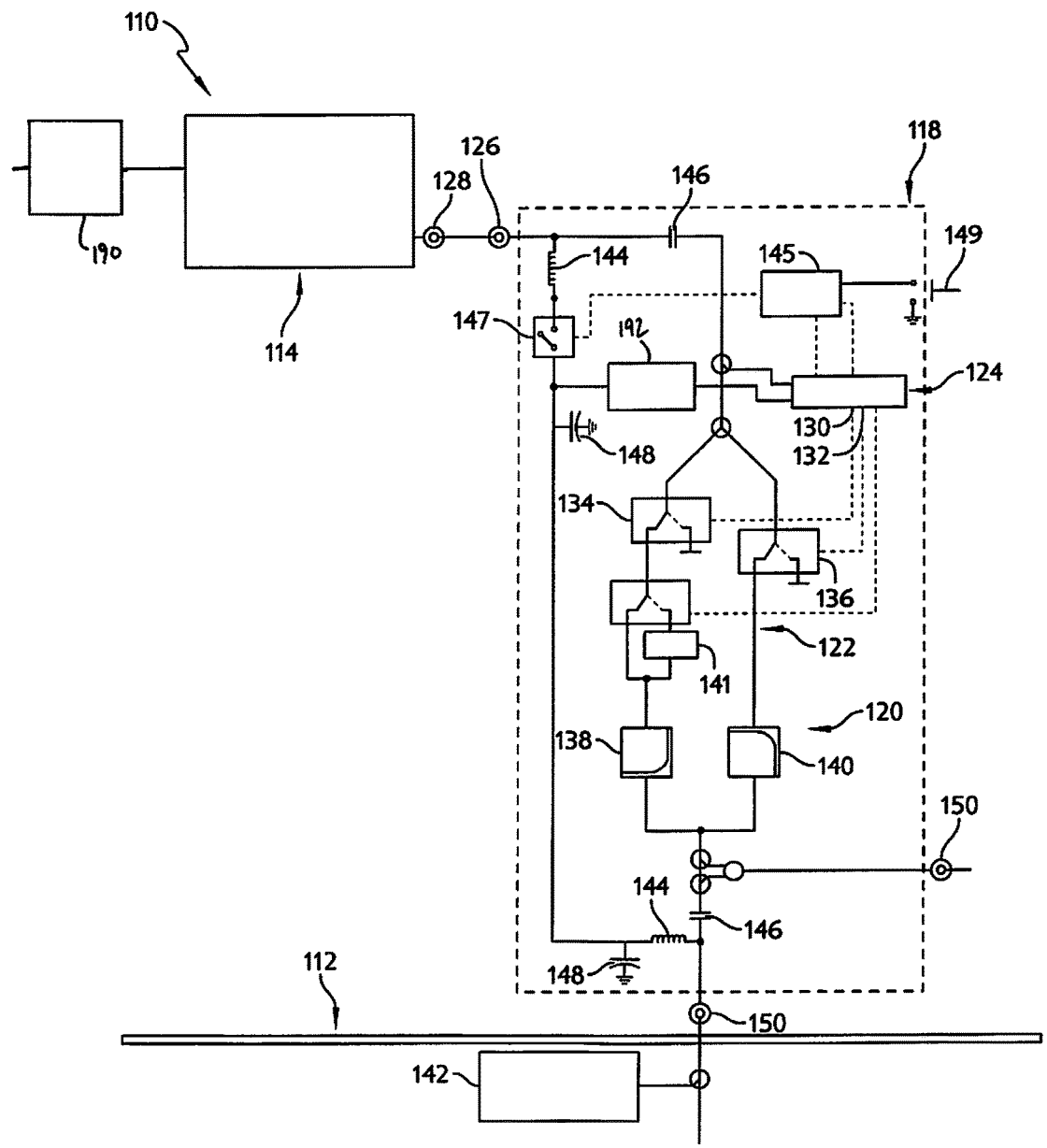
FIG. 2 illustrates a partly block and partly schematic drawing of another embodiment of the disclosure.
Figure 3:
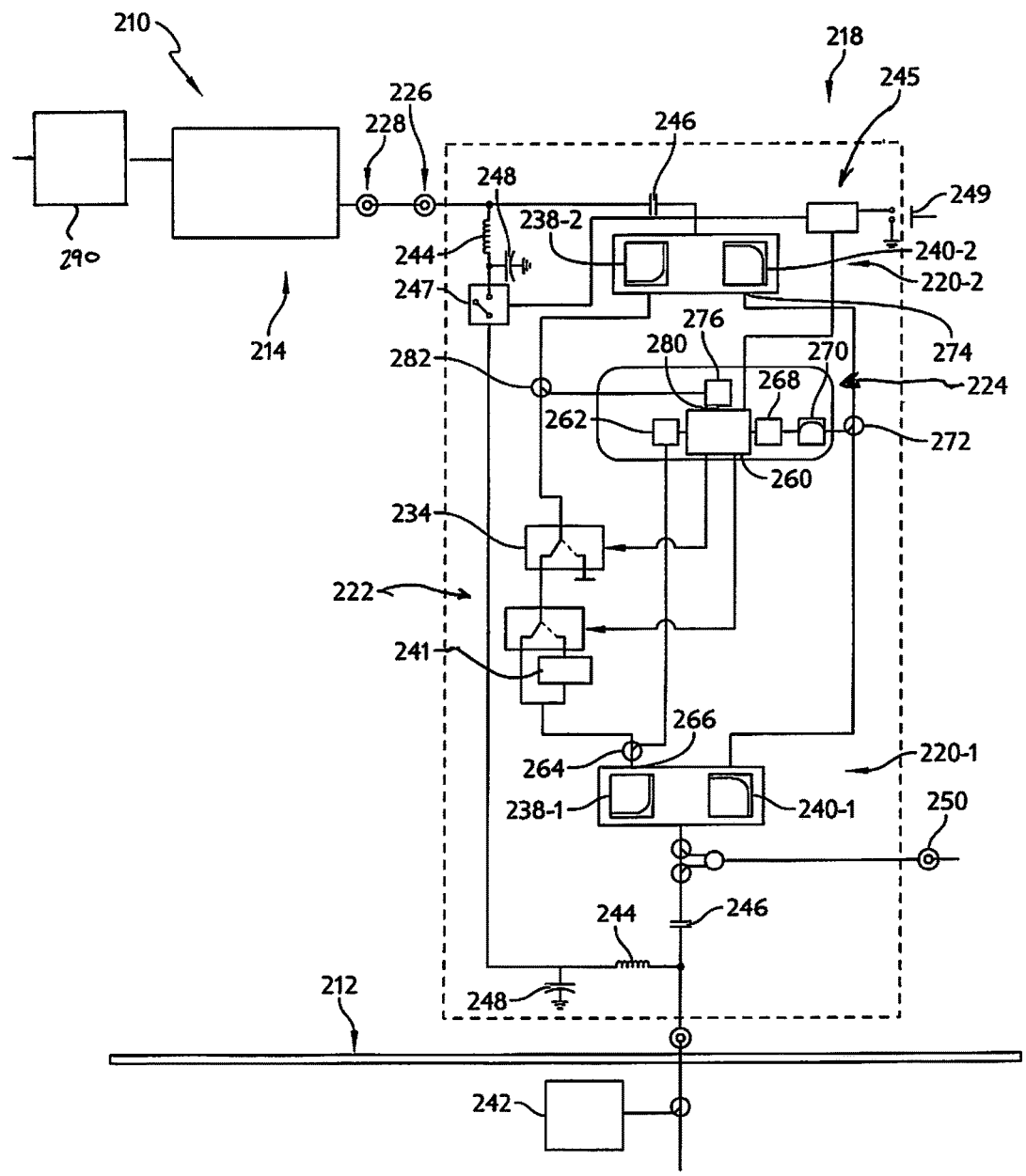
FIG. 3 illustrates a partly block and partly schematic drawing of another embodiment of the disclosure.

As with the embodiments illustrated in FIGS. 1-2, the embodiment illustrated in FIG. 3 includes a power inserter 242 through series inductors 244 to the node 214, the module 224 via the power supply 292, and other circuitry requiring power. Power control to deactivate and reactivate the ONU 214 is provided from a circuit 245, here, a one-shot, controlling a switch 247. Circuit 245 and thus switch 247 are under the control of switching signals from module 224, as well as from the network 210 via module 224. Device 218 also includes a pushbutton switch 249 to reset circuit 245 and switch 247, restoring the power supply to node 214. Capacitors 246 keep the power from the RF signal path. Capacitors 248 reduce ripple and store charge. One or more test points 250 may be provided for monitoring signal flow in one or the other direction, or both.

In another embodiment for use in HFC rather than RFOG, a device 318 for monitoring a subscriber premises 312 includes two diplex filters 320-1, 320-2, a switching device 322 and an on-premise intelligent ingress test module (hereinafter sometimes module) 324. An I/O port 326 of module 324 is coupled to receive and decode switching signals from the network 310, again, for example, a CATV/Internet/VOIP network. Output port 330 of module 324 operates switch 334 in the switching device 322 to disconnect the upstream bound output from a lowpass filter 338-1 in a diplex filter 320-1. The passbands of return, or upstream, band filters 338-1, 338-2 in diplex filters 320-1, 320-2 may be, for example 5 MHz-42 MHz, 5 MHz-65 MHz, 5 MHz-85 MHz or 5 MHz-200 MHz. The passbands of downstream band filters 340-1, 340-2 in diplex filters 320-1, 320-2 may be, for example, 50 MHz-1.8 GHz, 80 MHz-1.8 GHz, 110 MHz-1.8 GHz or 220 MHz-1.8 GHz. The return band path includes a switchable attenuator 341, for example, a 6 dB switchable attenuator, switchable via module 324.

Module 324 can be controlled by switching signals from the network 310 to close the switch 334, reconnecting the subscriber's premises 312 to the network 310. This can be done from the headend or other suitable location 390 sequentially from subscriber node 314 to subscriber node 314 by providing control signals to the subscriber nodes 314s' on-premise intelligent ingress test module 324. In this way, subscriber premises 312 can be disconnected from the network 310 one at a time to assist in determining the source(s) of RF noise in the system. As each premises 312 is disconnected, technicians at the head end 390 may analyze the upstream signals received from the other parts of the network 10 to determine which premises 312 is the source of the RF noise. This (these) RF noise source(s) can then be addressed by (a) service technician(s).

Module 324 also has "smart" capability. That is, module 324 monitors the noise generated by subscriber's premises 312. The module 324 acts to reduce, via attenuator 341, or remove, via switch 334, noise without CATV system or operator intervention. Module 324 is initially configured by server software (such as a module of Trilithic ViewPoint™ software). Once configured, the module 324 can: (1) monitor the noise coming out of a subscriber's premises 312 (by monitoring the return band spectrum); (2) enable the attenuator 341 to reduce the noise coming out of the subscriber's premises 312; or (3) disconnect, via switch 334, the return band from the subscriber's premises 312, thus cutting all noise.

Module 324 includes an FPGA 360 for signal processing, and an analog-to-digital (A/D) converter 362 for providing to FPGA 360 upstream-bound content from a tap 364 on an output port 366 of lowpass filter 338-1. Module 324 also includes an A/D 368 for providing bandpass 370 filtered downstream-bound content from a tap 372 on an output port 374 of highpass filter 340-2. Bandpass filter 370 has a passband of, for example, 80 MHz-100 MHz, 100 MHz-120 MHz, or the like. Bandpass filter 370 reduces the performance requirement on A/D 368, permitting a less expensive A/D to be used in this position. Digital output from a digital-to-analog (D/A) converter 376 coupled to an output port 380 of FPGA 360 is inserted into the upstream by a combiner 382. Switch 334 and attenuator 341 are controlled by outputs from module 324.

Timers can be built into module 324 to provide time for self-healing. Module 324 can monitor the noise coming from the subscriber's premises 312. This feature is provided because some subscribers' premises 312 are noisy only at certain times, for example, when certain power tools or other devices are operated, making troubleshooting difficult. When the noise has subsided, module 324 can operate switch 334 to reconnect the return path or remove the attenuation 341.

Any time module 324 takes action, module 324 reports to the server software the action module 324 has taken. With this feature, a history of every device 318—equipped subscriber's premises 312 showing when subscribers' premises 312 have caused network problems, is available to the CATV system operator. This history assists in dispatching technicians efficiently.

As an optional feature, module 324 can send periodic return band spectrum scans to the server so that data can be analyzed for trends. Preventative measures can be taken based upon this trending data.

As another optional feature, the entire return band may be passed through module 324. Module 324 would then not monitor the noise coming from the subscriber's premises 312, but rather would filter the return band and remove the noise before the noise reaches the upstream path in the network 310.

Figure 4:
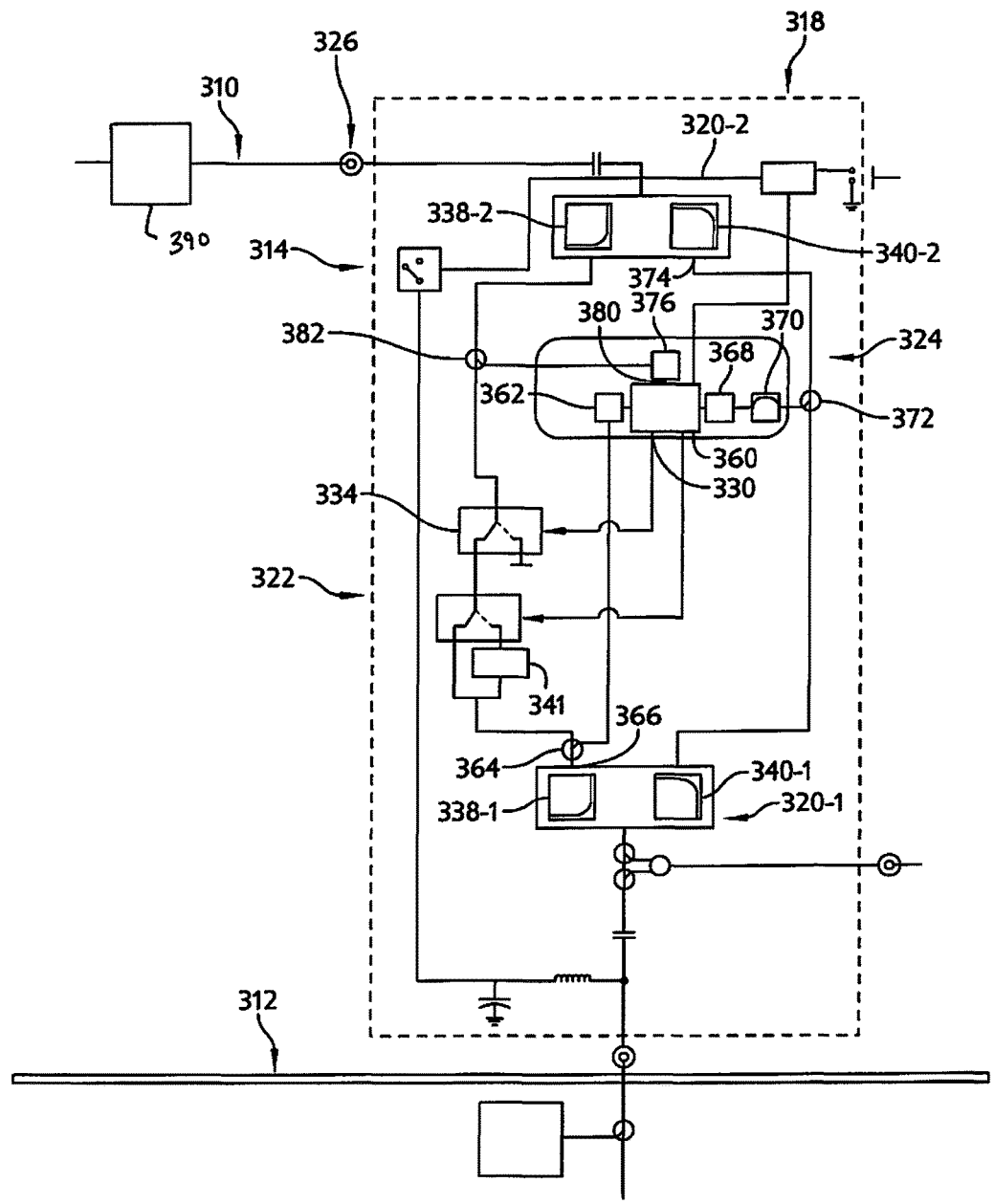
FIG. 4 illustrates a partly block and partly schematic drawing of another embodiment of the disclosure.

As with the embodiments illustrated in FIGS. 1-3, the embodiment illustrated in FIG. 4 includes a power inserter 342 through series inductors 344 to the node 314, the module 324 and other circuitry requiring power. Capacitors 346 keep the power from the RF signal path. Capacitors 348 reduce ripple and store charge. One or more test points 350 may be provided for monitoring signal flow in one or the other direction, or both.

While diplex filters 20, 120, 220-1, 220-2, 320-1, 320-2 are employed in the illustrated embodiments, it may be that diplex filters are not essential to the practice of the disclosure. The diplex filters 20, 120, 220-1, 220-2, 320-1, 320-2 may be replaced by splitters. It should also be understood that while ONU 14, 114, 214 and device 18, 118, 218 are illustrated as separate components, they may be packaged in a common housing, and may indeed by laid out on (a) common circuit board(s), and share components, such as power supplies and the like.

Figure 5:
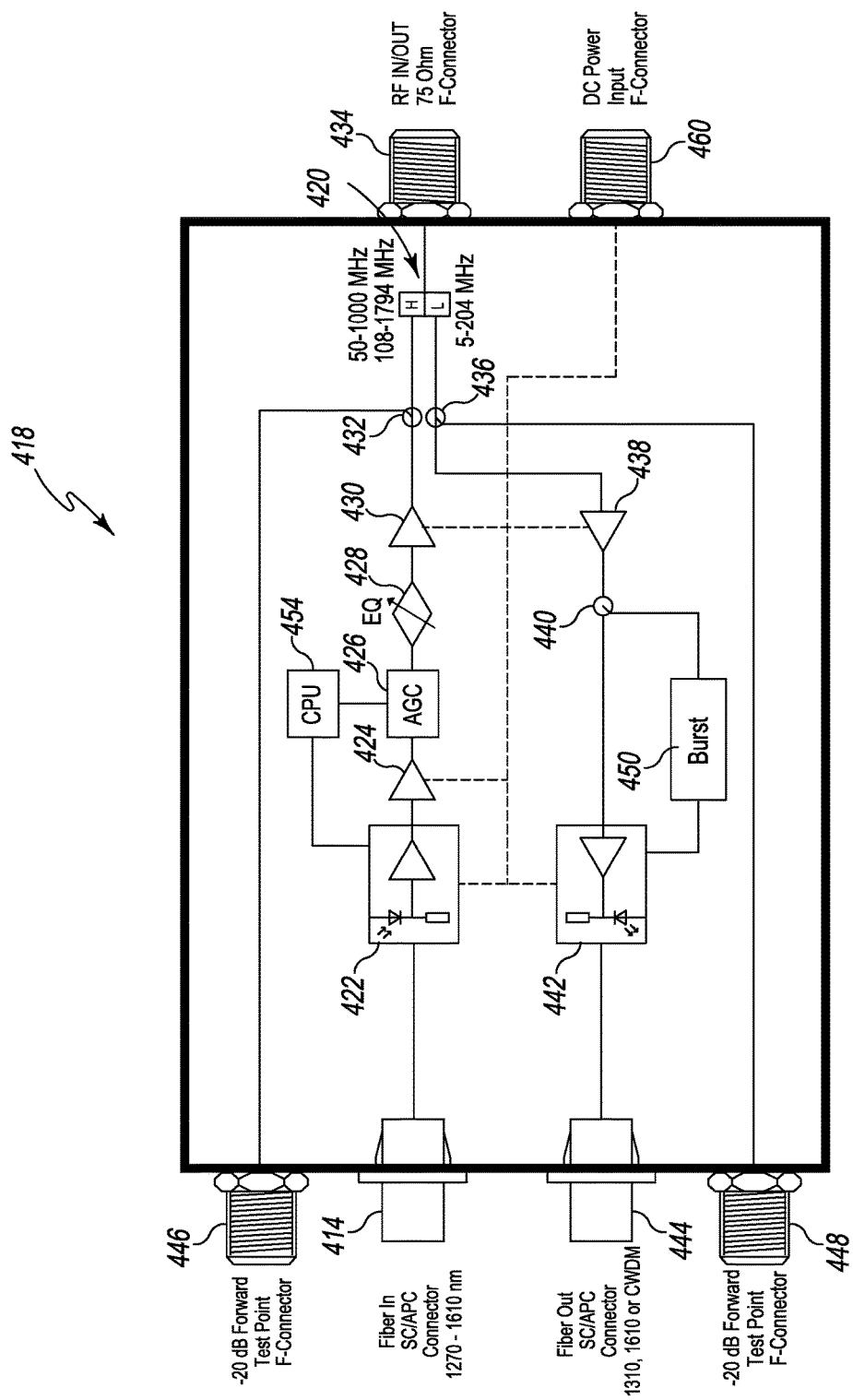
FIG. 5 illustrates a partly block and partly schematic drawing of another embodiment of the disclosure.

As illustrated in FIG. 5, a dual fiber ONU 418 includes, in series, a, for example, 1270-1610 nm wavelength, fiber input port SC/APC optical fiber connector 414, which may be connected to a head end of the cable network such as, for example, head end 90, 190, 290, 390, an optical-to-RF converter/optical receiver 422, an RF amplifier 424, an automatic gain control (AGC) circuit 426, an equalizer 428, an RF amplifier 430, a directional coupler/testpoint tap 432, the upper passband H of a diplex filter 420, and an RF input/output port 434, here illustrated as a 75Ω F-connector. These components of the downstream path are operable to convert the optic signals received from via the connector 414 into RF signals, which are provided to the subscriber's premises. Diplex filter 420 has a downstream passband of, for example, 50-1000 MHz or 108-1794 MHz, and an upstream passband of, for example, 5-204 MHz.

In the return path, the ONU 418 includes, in series, RF input/output port 434, the lower passband L of diplex filter 420, a directional coupler 436, an RF amplifier 438, a directional coupler 440, a return path RF-to-optical converter and optical transmitter 442, and a, for example, 1310 nm-, 1610 nm-, or coarse wavelength division multiplex (CWDM)-fiber output port SC/APC optical fiber connector 444.

The other terminal of directional coupler/testpoint tap 432 is coupled to a port, for example, a −20 dB forward testpoint F-connector 446, at which the amplitude of the signal at the output port of RF amplifier 430 can be measured. The other terminal of directional coupler 436 is coupled to a port, for example, a −20 dB return path testpoint F-connector 448, at which the amplitude of the signal at the output port of the lower passband L of diplex filter 420 can be measured. The other terminal of directional coupler 440 is coupled to an input port of a noise-immunizing burst circuit 450, which rectifies the signal appearing there and compares the rectified signal to a threshold, enabling return path optical transmitter 442 when the rectified signal reaches or exceeds the threshold, in order to pass data upstream from the subscriber premises. In the illustrative embodiment, the threshold is about 10 dBmV, which is above the typical noise level but below the value of modem burst during a transmission. It should be appreciated that in other embodiments the threshold may be set during a calibration step at the time of manufacture. In a similar manner, an output of the AGC 426 is processed by a central processing unit (CPU) 454, the output from which controls the RF output amplitude of optical receiver 422. Power is supplied from, for example, subscriber premises 412, to circuits in the ONU 418 requiring power through, for example, a DC power input F-connector 460.

Figure 6:
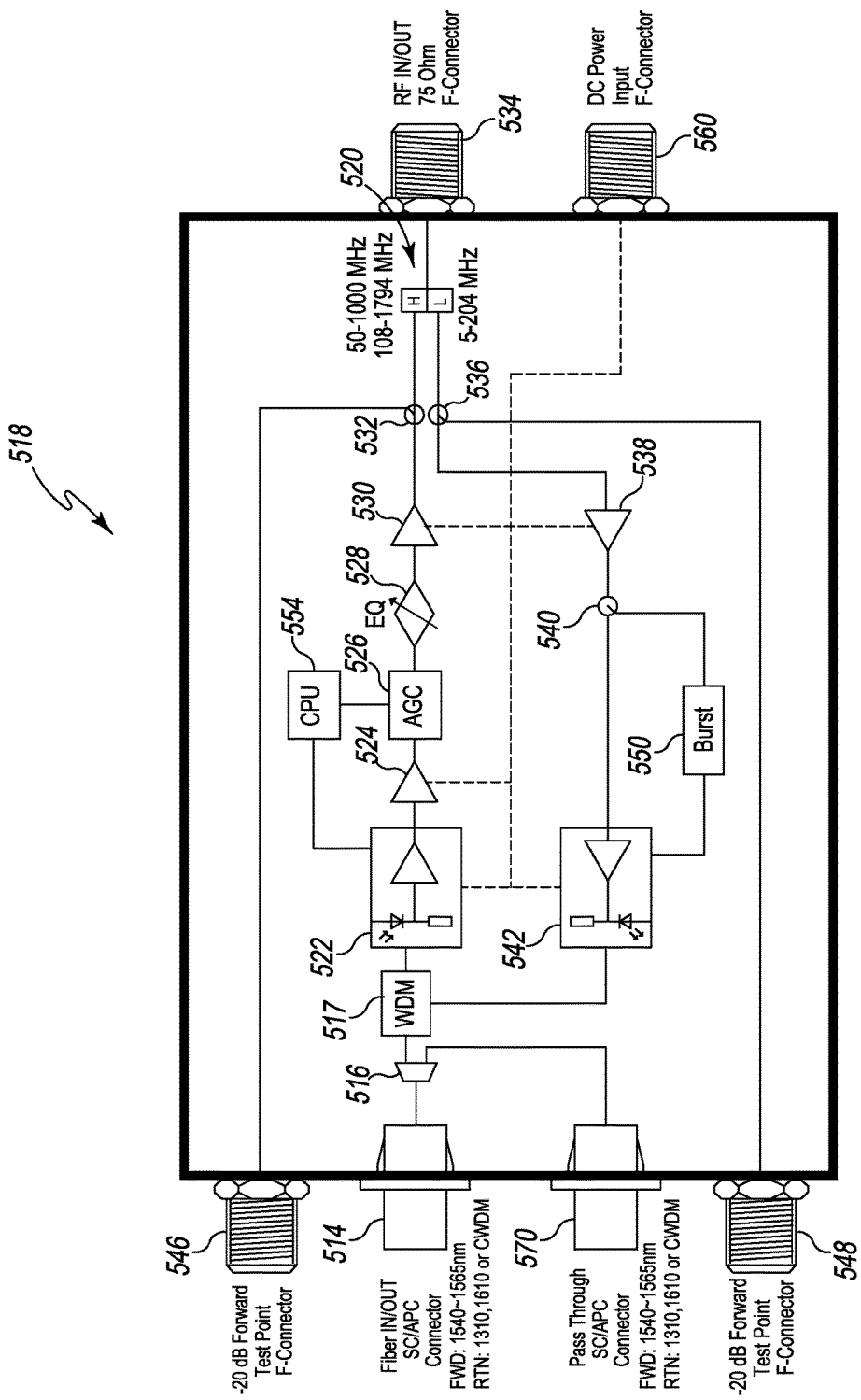
FIG. 6 illustrates a partly block and partly schematic drawing of another embodiment of the disclosure.

In another embodiment, illustrated in FIG. 6, a single fiber ONU 518 with passive optical network (PON) passthrough port includes, in series, a, for example, forward 1540-1565 nm-return 1310 nm-, 1610 nm-, or CWDM wavelength, fiber input/output port SC/APC optical fiber connector 514, a wavelength division multiplex (WDM) splitter/combiner 516, a wavelength division multiplexer (WDM) 517, an optical-to-RF converter/optical receiver 522, an RF amplifier 524, an AGC circuit 526, an equalizer 528, an RF amplifier 530, a directional coupler/testpoint tap 532, the upper passband H of a diplex filter 520, and an RF input/output port 534, here illustrated as a 75Ω F-connector.

In the return path, the ONU 518 includes, in series, RF input/output port 534, the lower passband L of diplex filter 520, a directional coupler 536, an RF amplifier 538, a directional coupler 540, a return path RF-to-optical converter and optical transmitter 542, WDM 517, WDM splitter/combiner 516, and optical fiber connector 514.

The other terminal of directional coupler/testpoint tap 532 is coupled to a port, for example, a −20 dB forward testpoint F-connector 546, at which the amplitude of the signal at the output port of RF amplifier 530 can be measured. The other terminal of tap 536 is coupled to a port, for example, a −20 dB return path testpoint F-connector 548, at which the amplitude of the signal at the output port of the lower passband L of diplex filter 520 can be measured. The other terminal of splitter 540 is coupled to an input port of a noise-immunizing burst circuit 550 which rectifies the signal appearing there and compares the rectified signal to a threshold, enabling return path optical transmitter 542 when the rectified signal reaches or exceeds the threshold, in order to pass data upstream from the subscriber premises. In the illustrative embodiment, the threshold is about 10 dBmV, which is above the typical noise level but below the value of modem burst during a transmission. It should be appreciated that in other embodiments the threshold may be set during a calibration step at the time of manufacture. In a similar manner, an output of the AGC 526 is processed by a central processing unit (CPU) 554, the output from which controls the RF output amplitude of optical receiver 522. Power is supplied from, for example, subscriber premises 512, to circuits in the ONU 518 requiring power through, for example, a DC power input F-connector 560. In this embodiment, the optical signal at port 514 is also passed through splitter/combiner 516 to a passthrough input/output port SC/APC optical fiber connector 570 for coupling to other ONUs in series.

Figure 7:
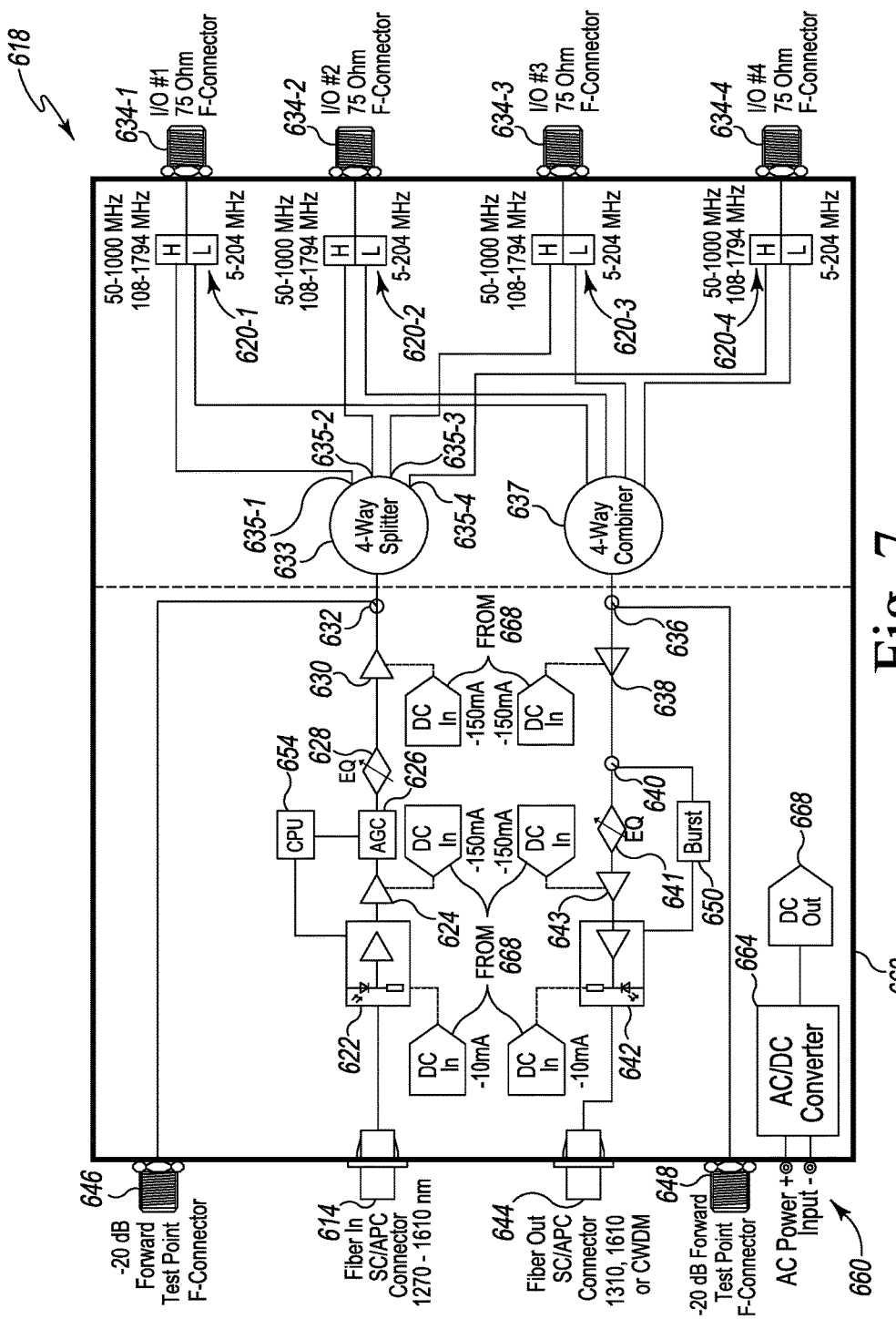
FIG. 7 illustrates a partly block and partly schematic drawing of another embodiment of the disclosure.

In another embodiment, illustrated in FIG. 7, the ONU 618 is moved from the exterior of the subscriber premises to a pedestal, pole or the like, typically in the vicinity of the subscriber's premises. A dual fiber ONU 618 includes, in series, a, for example, 1270-1610 nm wavelength, fiber input port SC/APC optical fiber connector 614, an optical-to-RF converter/optical receiver 622, an RF amplifier 624, an AGC circuit 626, an equalizer 628, an RF amplifier 630, a directional coupler/testpoint tap 632, and a four-way RF splitter 633. The four output ports 635-1-635-4 of splitter 633 are coupled to the input ports of respective upper passbands H of respective diplex filters 620-1-620-4. The input/output ports of the respective diplex filters 620-1-620-4 are coupled to respective RF input/output ports 634-1-634-4. Here RF input/output ports 634-1-634-4 illustratively are 75Ω F-connectors. Again, diplex filter 620 has a downstream passband of, for example, 50-1000 MHz or 108-1794 MHz, and an upstream passband of, for example, 5-204 MHz.

The return path includes, in series, RF input/output ports 634-1-634-4, the input/output ports of the respective diplex filters 620-1-620-4, the lower passbands L of respective diplex filters 620-1-620-4, respective input ports of a four-input combiner 637, a directional coupler 636, an RF amplifier 638, a directional coupler 640, an equalizer 641, an RF amplifier 643, a return path RF-to-optical converter and optical transmitter 642, and a, for example, 1310 nm-, 1610 nm-, or CWDM-fiber output port SC/APC optical fiber connector 644.

The other terminal of directional coupler/testpoint tap 632 is coupled to a port, for example, a −20 dB forward testpoint F-connector 646, at which the amplitude of the signal at the output port of RF amplifier 630 can be measured. The other terminal of directional coupler 636 is coupled to a port, for example, a −20 dB return path testpoint F-connector 648, at which the amplitude of the signal at the output port of combiner 637 can be measured. The other terminal of directional coupler 640 is coupled to an input port of a noise-immunizing burst circuit 650 which rectifies the signal appearing there and compares the rectified signal to a threshold, enabling return path optical transmitter 642 when the rectified signal reaches or exceeds the threshold, in order to pass data upstream from the subscriber premises. In the illustrative embodiment, the threshold is about 10 dBmV, which is above the typical noise level but below the value of modem burst during a transmission. It should be appreciated that in other embodiments the threshold may be set during a calibration step at the time of manufacture. In a similar manner, an output of the AGC 626 is processed by a central processing unit (CPU) 654, the output from which controls the RF output amplitude of optical receiver 622.

Power is supplied from, for example, electrical conductors encapsulated with the optical fibers coupled to connectors 614, 644, to a port 660 on the ONU housing 662. The ONU housing houses an AC/DC converter 664, which receives the AC from port 660 and outputs (a) DC voltage(s) at (an) appropriate magnitude(s) for supply 668 to circuits in the ONU 618 requiring power.

Figure 8:
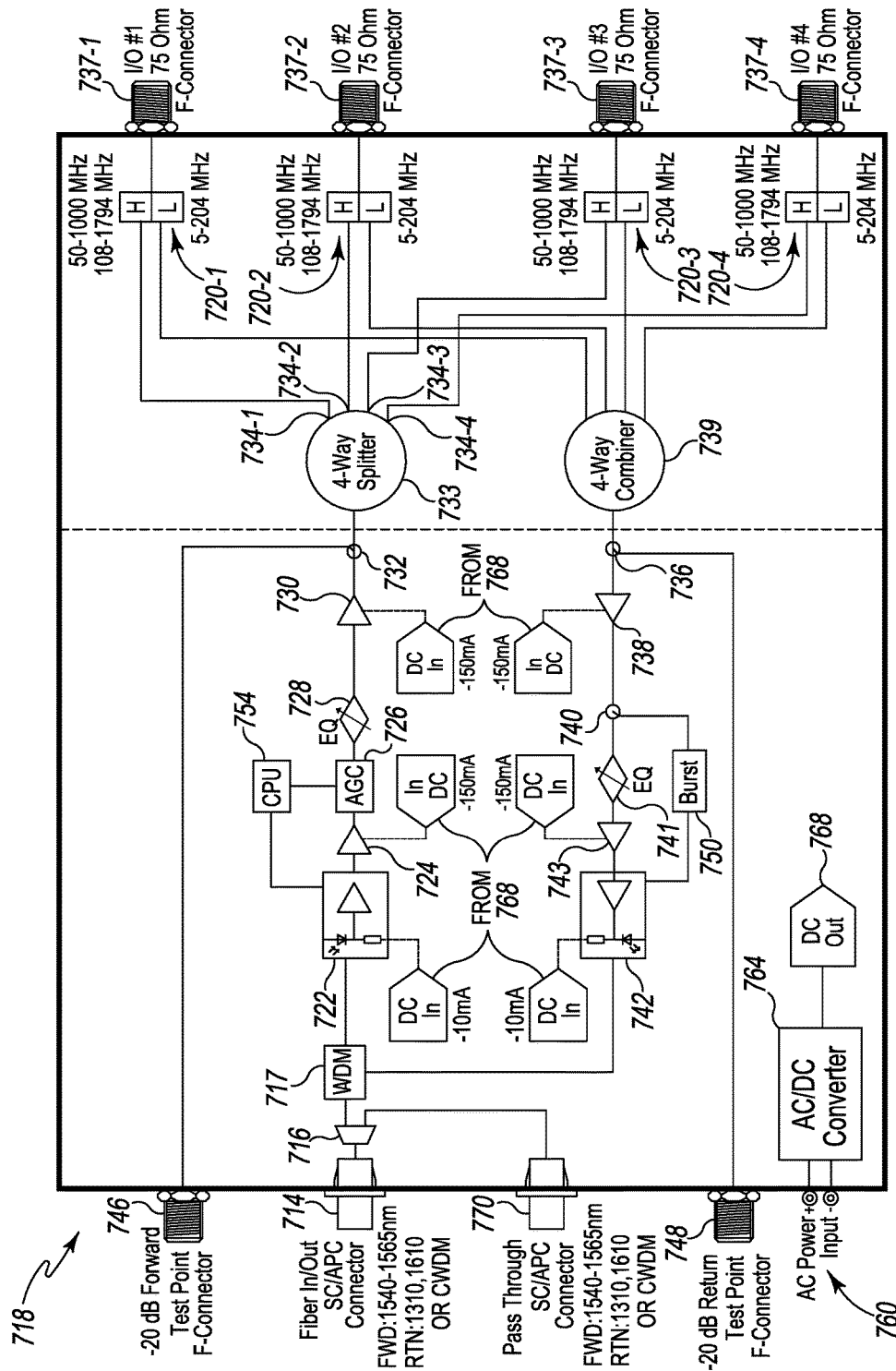
FIG. 8 illustrates a partly block and partly schematic drawing of another embodiment of the disclosure.

With reference to FIG. 8, in another embodiment for mounting on a pedestal, pole or the like, a single fiber ONU 718 with power includes, in series, a, for example, forward 1540-1565 nm wavelength, return 1310 nm, 1610 nm or CWDM, fiber input/output port SC/APC optical fiber connector 714, a splitter/combiner 716, a wavelength division multiplexer (WDM) 717, an optical-to-RF converter/optical receiver 722, an RF amplifier 724, an AGC circuit 726, an equalizer 728, an RF amplifier 730, and a directional coupler/testpoint tap 732, and a four-way RF splitter 733. The four output ports 734-1-734-4 of splitter 733 are coupled to the input ports of respective upper passbands H of respective diplex filters 720-1-720-4. The input/output ports of the respective diplex filters 720-1-720-4 are coupled to respective RF input/output ports 737-1-737-4. Here RF input/output ports 737-1-737-4 illustratively are 75Ω F-connectors. Again, diplex filters 720-1-720-4 have a downstream passband of, for example, 50-1000 MHz or 108-1794 MHz, and an upstream passband of, for example, 5-204 MHz.

The return path includes, in series, RF input/output ports 737-1-737-4, the input/output ports of the respective diplex filters 720-1-720-4, the lower passbands L of respective diplex filters 720-1-720-4, a four-input combiner 739, a directional coupler 736, an RF amplifier 738, a directional coupler 740, an equalizer 741, an RF amplifier 743, a return path RF-to-optical converter and optical transmitter 742, WDM 717, splitter/combiner 716, and fiber input/output port SC/APC optical fiber connector 714.

The other terminal of directional coupler/testpoint tap 732 is coupled to a port, for example, a −20 dB forward testpoint F-connector 746, at which the amplitude of the signal at the output port of RF amplifier 730 can be measured. The other terminal of tap 736 is coupled to a port, for example, a −20 dB return path testpoint F-connector 748, at which the amplitude of the signal at the output port of four-input combiner 739 can be measured. The other terminal of splitter 740 is coupled to an input port of a noise-immunizing burst circuit 750 which rectifies the signal appearing there and compares the rectified signal to a threshold, enabling return path optical transmitter 742 when the rectified signal reaches or exceeds the threshold, in order to pass data upstream from the subscriber premises. In a similar manner, an output of the AGC 726 is processed by a central processing unit (CPU) 754, the output from which controls the RF output amplitude of optical receiver 722.

Power is supplied from, for example, electrical conductors encapsulated with the optical fibers coupled to connectors 714, 744, to a port 760 on the ONU housing 762. The ONU housing houses an AC/DC converter 764 which receives the AC from port 760 and outputs (a) DC voltage(s) at (an) appropriate magnitude(s) for supply 768 to circuits in the ONU 718 requiring power. Again in this embodiment, the optical signal at port 714 is also passed through splitter/combiner 716 to a passthrough input/output port SC/APC optical fiber connector 770 for coupling to other ONUs in series.

Figure 9A:
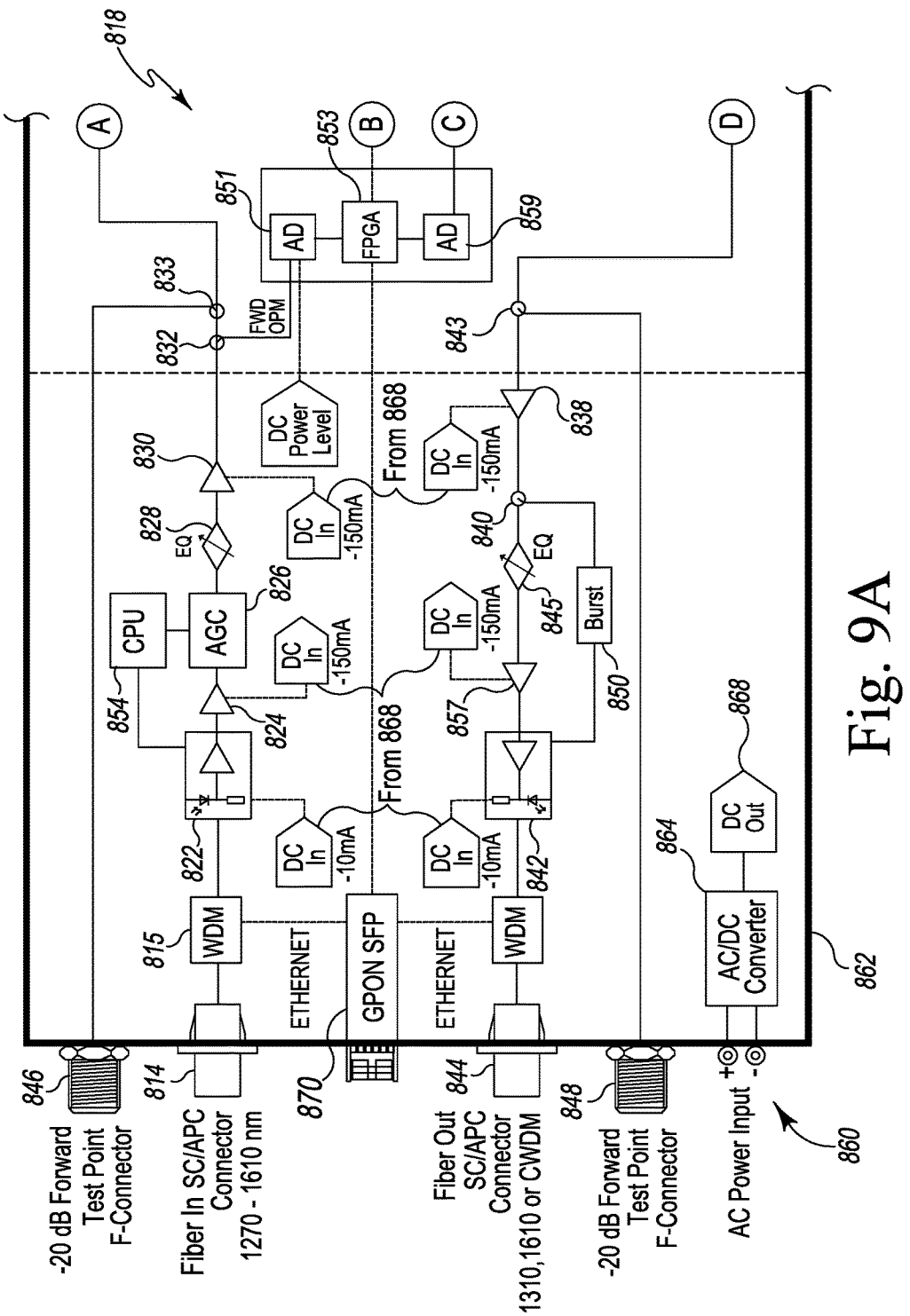
FIG. 9 illustrates a partly block and partly schematic drawing of another embodiment of the disclosure.
Figure 9B:
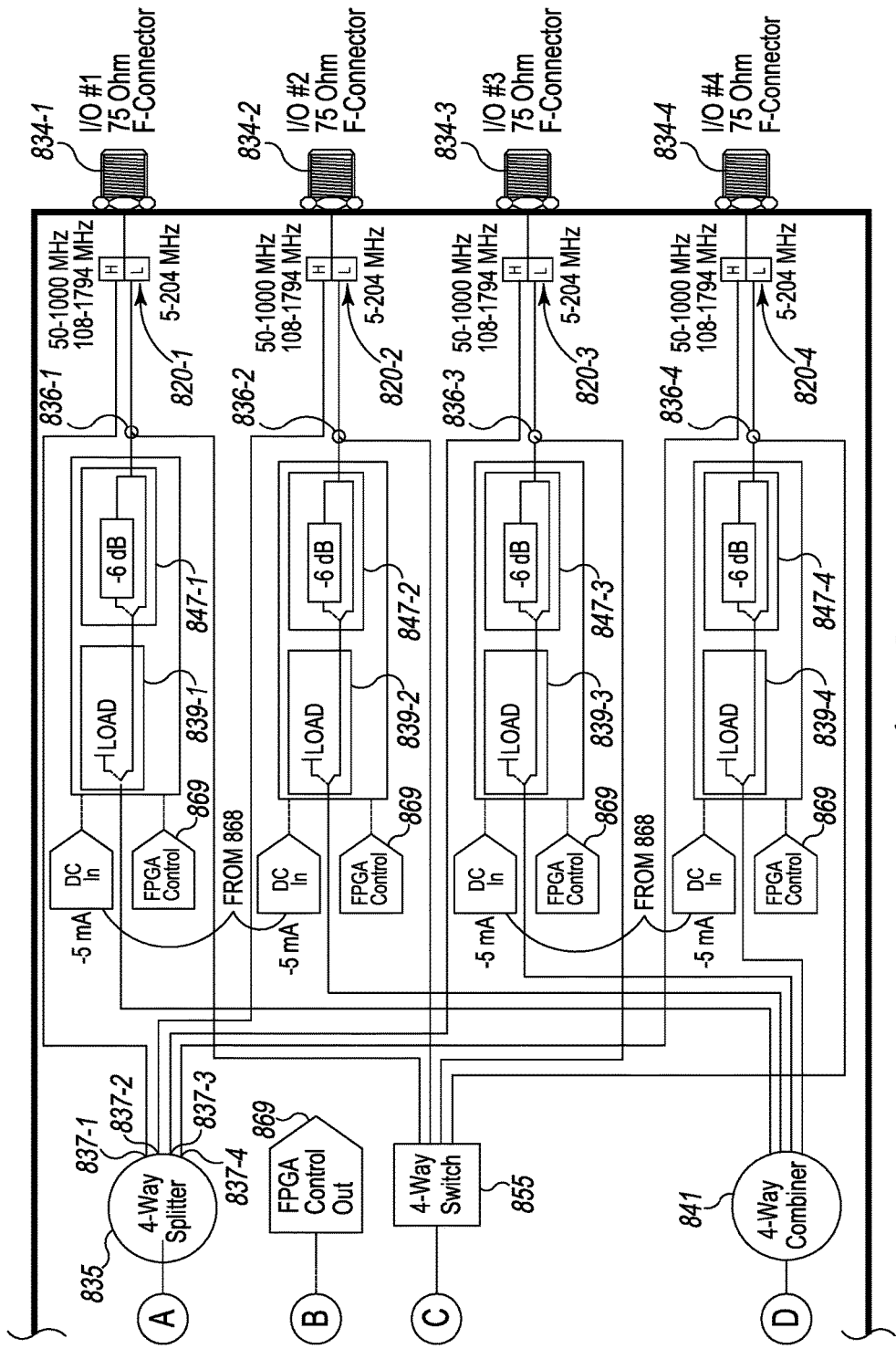

With reference to FIG. 9, in another embodiment for mounting on a pedestal, pole or the like, a dual fiber ONU 818 includes, in series, a, for example, 1270-1610 nm wavelength, fiber input port SC/APC optical fiber connector 814, a WDM 815, an optical-to-RF converter/optical receiver 822, an RF amplifier 824, an AGC circuit 826, an equalizer 828, an RF amplifier 830, a directional coupler/testpoint tap 832, a directional coupler/testpoint tap 833, and a four-way RF splitter 835. The four output ports 837-1-837-4 of splitter 835 are coupled to the input ports of respective upper passbands H of respective diplex filters 820-1-820-4. The input/output ports of the respective diplex filters 820-1-820-4 are coupled to respective RF input/output ports 834-1-834-4. Here RF input/output ports 834-1-834-4 illustratively are 75Ω F-connectors. Diplex filters 820-1-820-4 illustratively have downstream passbands of, for example, 50-1000 MHz or 108-1794 MHz, and upstream passbands of, for example, 5-204 MHz.

In the return path, the ONU 818 includes, in series, RF input/output ports 834-1-834-4, the lower passbands L of respective diplex filters 820-1-820-4, directional couplers 836-1-836-4, respective 6 db attenuator switches 847-1-847-4, respective disconnect switches 839-1-839-4, a four-way combiner 841, a directional coupler 843, an RF amplifier 838, a directional coupler 840, an equalizer 845, an RF amplifier 857, a return path RF-to-optical converter and optical transmitter 842, a WDM 849 and a, for example, 1310 nm-, 1610 nm-, or CWDM-fiber output port SC/APC optical fiber connector 844.

The other terminal of directional coupler/testpoint tap 832 is coupled to an A/D converter 851, an output port of which is coupled to an input port of a Field Programmable Gate Array (FPGA) 853. The other terminal of directional coupler/testpoint tap 833 is coupled to a port, for example, a −20 dB forward testpoint F-connector 846, at which the amplitude of the signal at the output port of RF amplifier 830 can be measured. The other terminal of directional coupler 843 is coupled to a port, for example, a −20 dB return path testpoint F-connector 848, at which the amplitude of the signal at the output port of four-way combiner 841 can be measured. The other terminals of directional couplers 836-1-836-4 are coupled to four input ports of a four-way switch 855, an output port of which is coupled to an input port of an A/D converter 859. An output port of A/D converter 859 is coupled to an input port of FPGA 853. The other terminal of directional coupler 840 is coupled to an input port of a noise-immunizing burst circuit 850, which rectifies the signal appearing there and compares the rectified signal to a threshold, enabling return path optical transmitter 842 when the rectified signal reaches or exceeds the threshold, in order to pass data upstream from the subscriber premises. In the illustrative embodiment, the threshold is about 10 dBmV, which is above the typical noise level but below the value of modem burst during a transmission. It should be appreciated that in other embodiments the threshold may be set during a calibration step at the time of manufacture or based upon measurements taken by the FPGA 853 through the switch 855 as the switch 855 is cycling through each port 834-1-834-4 at a rate fast enough to see the rise/edge of the beginning of a DOCSIS modem transmission. In a similar manner, an output of the AGC 826 is processed by a central processing unit CPU 854, the output from which controls the RF output amplitude of optical receiver 822.

Power is supplied from, for example, electrical conductors encapsulated with the optical fiber coupled to connectors 814 to a port 860 on the ONU housing 862. The ONU housing houses an AC/DC converter 864 which receives the AC from port 860 and outputs (a) DC voltage(s) at (an) appropriate magnitude(s) for supply 868 to circuits in the ONU 818 requiring power.

The A/D converter 851 receives the RF converter signal from the optical fiber coupled to connector 814, which may include instructions from the head end (not shown) of the cable provider. These are digitized by A/D 851 and provided to FPGA 853 to control, via connections 869, 6 db attenuator switches 847-1-847-4 and disconnect switches 839-1-839-4. In that way, the FPGA 853 acts as a control circuit for the ONU 818 that is configured to both test the upstream and downstream signals paths and operate one or more switches to adjust those signals or (in the case of the upstream signals) prevent their transmission to the rest of the cable network. For example, the head end may provide instructions to operate the switch 855 to selectively monitor the noise signal from each of the directional couplers 836-1-836-4 and hence the noise produced by each premises connected to each of the couplers. Based on the noise level, the FPGA 853 (on its own or in response to instructions from the head end) generates one or more signals to operate the attenuator switches 847-1-847-4 and/or disconnect switches 839-1-839-4 to isolate the noise source. It should also be appreciated that the FPGA 853 may be programmed to continuously or periodically monitor the noise signal from each of the directional couplers 836-1-836-4 and selectively operate the attenuator switches 847-1-847-4 and/or disconnect switches 839-1-839-4 to isolate the noise source based on the noise levels.

As shown in FIG. 9, the WDMs 815 and 849 are coupled to a Small Form factor Pluggable Gigabit Passive Optical Network (GPON SFP) 870 to provide additional monitoring of the status of ONU 818 and subscriber equipment coupled to RF input/output ports 834-1-834-4.

Figure 10A:
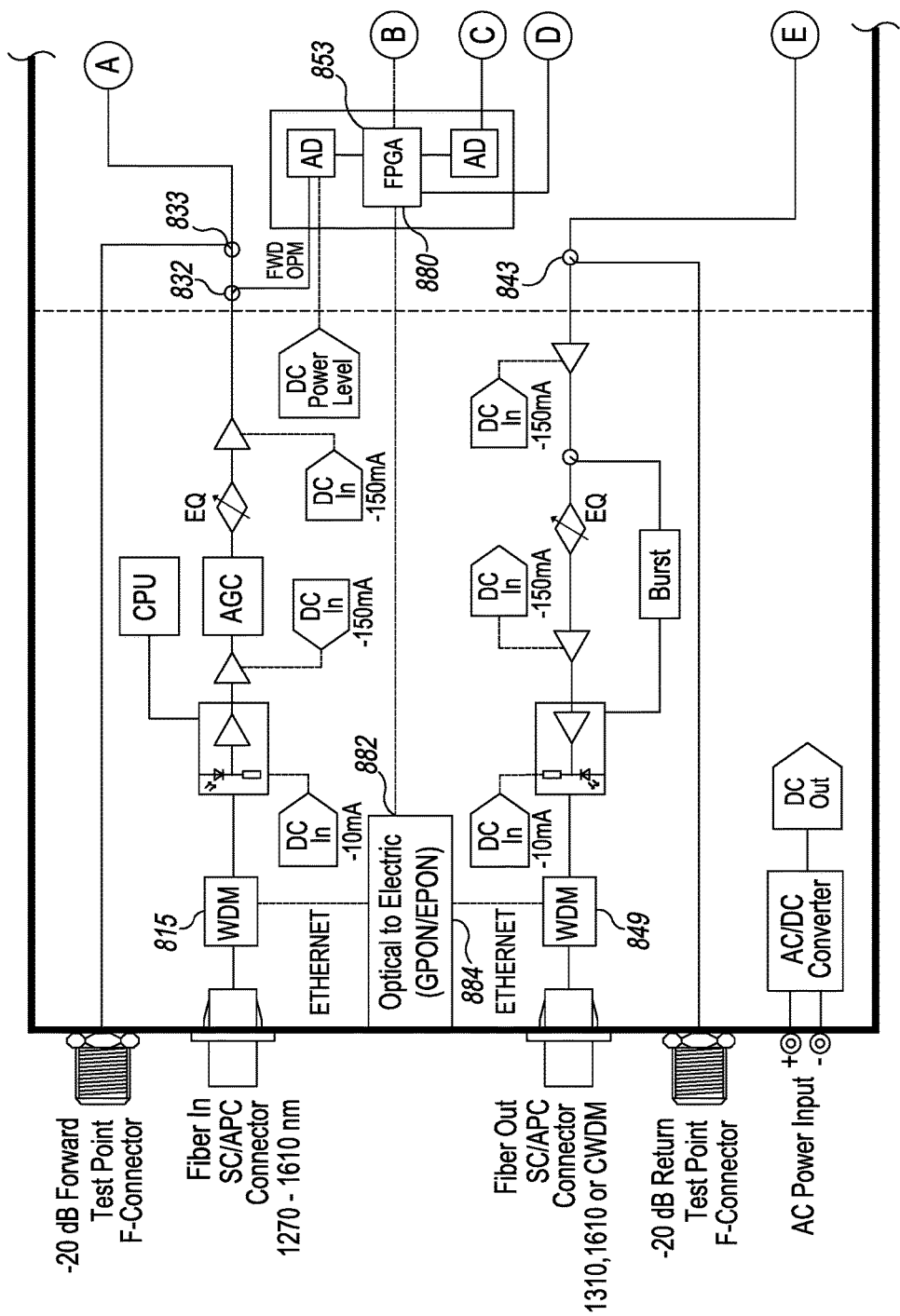
FIG. 10 illustrates a partly block and partly schematic drawing of another embodiment of the disclosure.
Figure 10B:
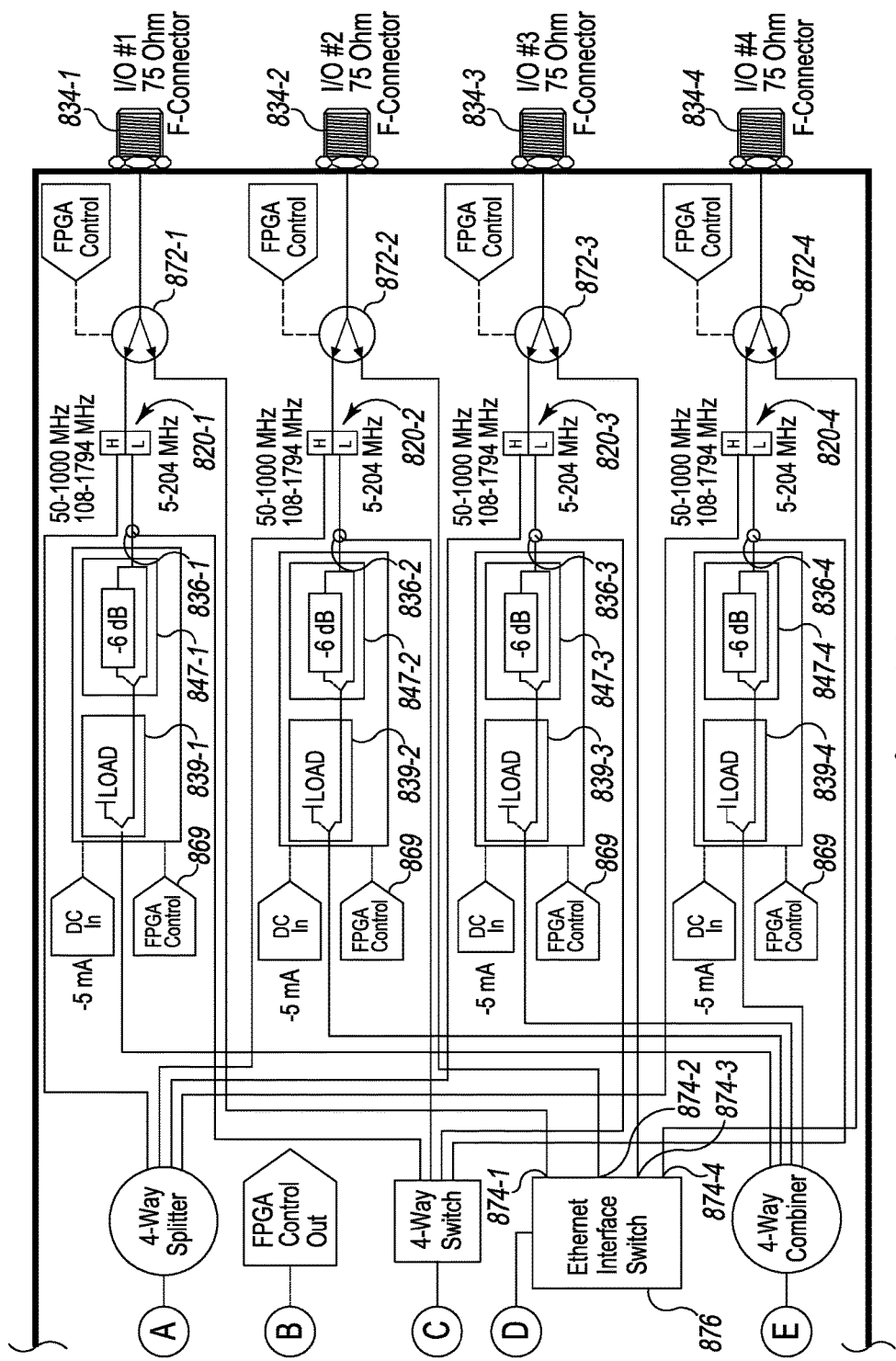

With reference to FIG. 10, an embodiment like the embodiment illustrated in FIG. 9, but with additional features, is illustrated. Except as otherwise described hereinafter, the circuit illustrated in FIG. 10 is as illustrated and described in connection with FIG. 9. In FIG. 10, a dual fiber ONU with power, four input/output ports to subscribers' premises and return monitoring logic also includes an Internet Protocol (IP) network-ready feature. To implement this feature, the embodiment illustrated in FIG. 10 includes respective FPGA 853—controlled switches 872-1-872-4 in series between respective RF input/output ports 834-1-834-4 and the respective diplex filters 820-1-820-4. One input/output port of each switch 872-1-872-4 is coupled to an input/output port of a respective diplex filter 820-1-820-4. Another input/output port of each switch 872-1-872-4 is coupled to a respective input output port 874-1, 874-2, 874-3, 874-4 of an Ethernet interface switch 876. Another input/output port 878 of switch 876 is coupled to FPGA 853. An input/output port 880 of FPGA 853 is coupled to an input/output port 882 of a Gigabit Passive Optical Network/Ethernet Passive Optical Network (GPON/EPON) 884, additional input/output ports of which are coupled to WDMs 815, 849.

Figure 11A:
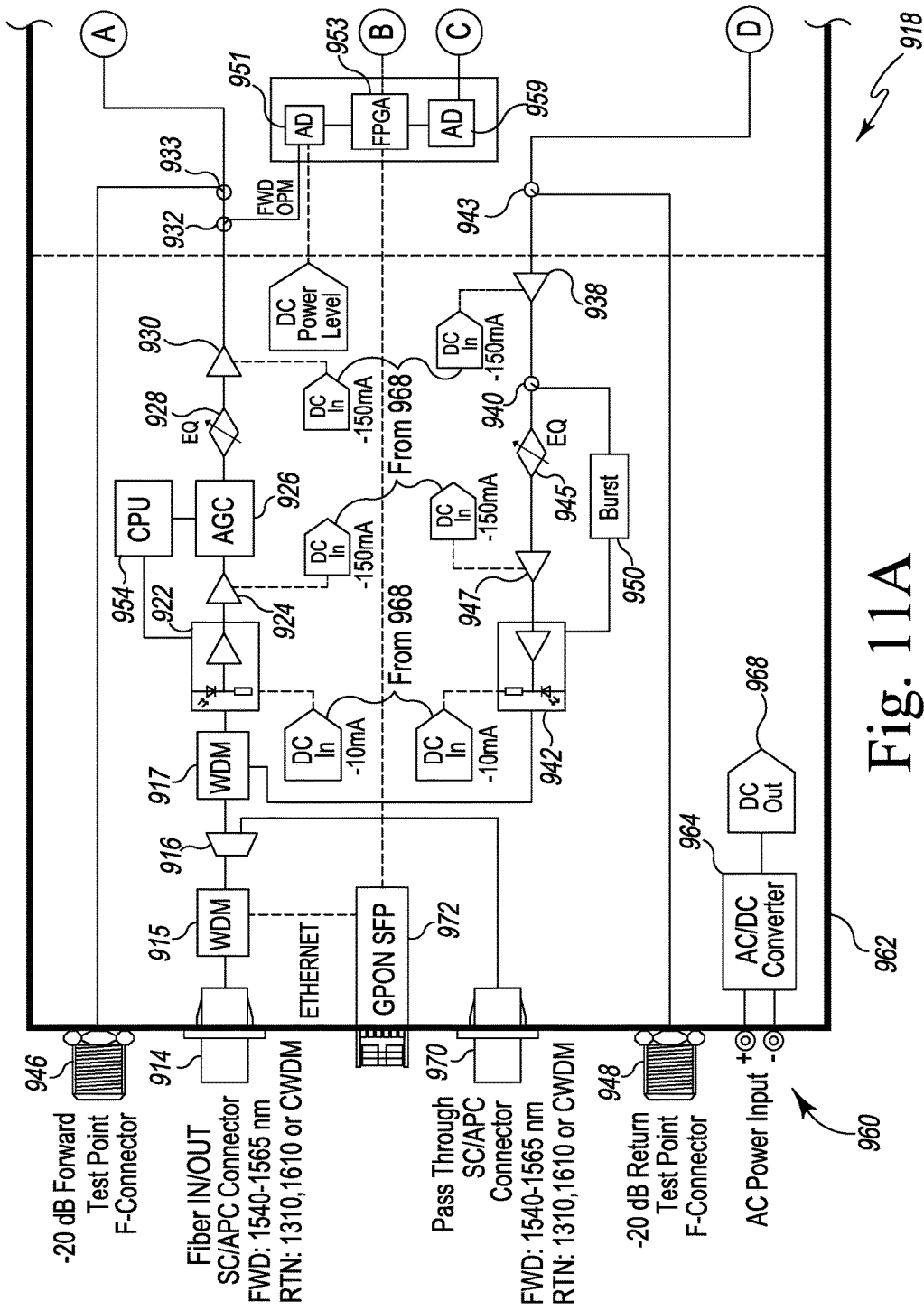
FIGS. 11A-B illustrate a partly block and partly schematic drawing of another embodiment of the disclosure; and, FIG. 12 illustrates a partly block and partly schematic drawing of another embodiment of the disclosure.
Figure 11B:
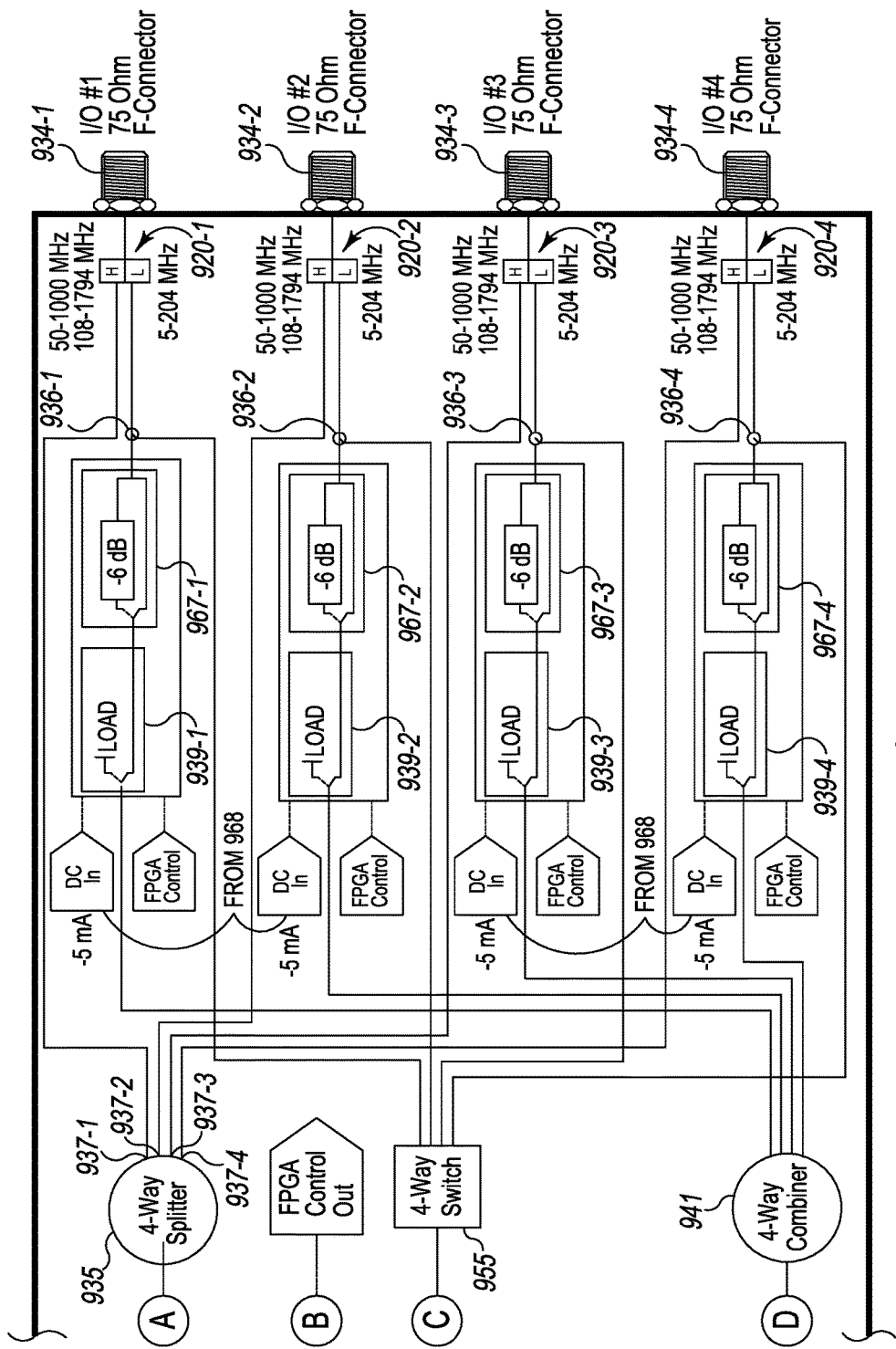

With reference to FIG. 11, in another embodiment for mounting on a pedestal, pole or the like, a single fiber ONU 918 with power and monitoring logic for the return path includes, in series, a, for example, forward 1540-1565 nm wavelength, return 1310 nm, 1610 nm or CWDM, fiber input/output port SC/APC optical fiber connector 914, a WDM 915, a splitter/combiner 916, a WDM 917, an optical-to-RF converter/optical receiver 922, an RF amplifier 924, an AGC circuit 926, an equalizer 928, an RF amplifier 930, a directional coupler/testpoint tap 932, a directional coupler/testpoint tap 933, and a four-way RF splitter 935. The four output ports 937-1-937-4 of splitter 935 are coupled to the input ports of respective upper passbands H of respective diplex filters 920-1-920-4. The input/output ports of the respective diplex filters 920-1-920-4 are coupled to respective RF input/output ports 934-1-934-4. Here RF input/output ports 934-1-934-4 illustratively are 75Ω F-connectors. Diplex filters 920-1-920-4 illustratively have downstream passbands of, for example, 50-1000 MHz or 108-1794 MHz, and upstream passbands of, for example, 5-204 MHz.

In the return path, the ONU 918 includes, in series, RF input/output ports 934-1-934-4, the lower passbands L of respective diplex filters 920-1-920-4, directional couplers 936-1-936-4, respective 6 db attenuator switches 967-1-967-4, respective disconnect switches 939-1-939-4, a four-way combiner 941, a directional coupler 943, an RF amplifier 938, a directional coupler 940, an equalizer 945, an RF amplifier 947, a return path RF-to-optical converter and optical transmitter 942, WDM 917, splitter/combiner 916, WDM 915, and optical fiber connector 914. The other terminal of directional coupler/testpoint tap 932 is coupled to an A/D converter 951, an output port of which is coupled to an input port of a FPGA 953. The other terminal of directional coupler/testpoint tap 933 is coupled to a port, for example, a −20 dB forward testpoint F-connector 946, at which the amplitude of the signal at the output port of RF amplifier 930 can be measured. The other terminal of directional coupler 943 is coupled to a port, for example, a −20 dB return path testpoint F-connector 948, at which the amplitude of the signal at the output port of four-way combiner 941 can be measured. The other terminals of directional couplers 936-1-936-4 are coupled to four input ports of a four-way switch 955, an output port of which is coupled to an input port of an A/D converter 959. An output port of A/D converter 959 is coupled to an input port of FPGA 953. The other terminal of directional coupler 940 is coupled to an input port of a noise-immunizing burst circuit 950 which rectifies the signal appearing there and compares the rectified signal to a threshold, enabling return path optical transmitter 942 when the rectified signal reaches or exceeds the threshold, in order to pass data upstream from the subscriber premises. In the illustrative embodiment, the threshold is about 10 dBmV, which is above the typical noise level but below the value of modem burst during a transmission. It should be appreciated that in other embodiments the threshold may be set during a calibration step at the time of manufacture or based upon measurements taken by the FPGA 953 through the switch 955 as the switch 955 is cycling through each port 934-1-934-4 at a rate fast enough to see the rise/edge of the beginning of a DOCSIS modem transmission. In a similar manner, an output of the AGC 926 is processed by a central processing unit CPU 954, the output from which controls the RF output amplitude of optical receiver 922.

Power is supplied from, for example, electrical conductors encapsulated with the optical fiber coupled to connectors 914 to a port 960 on the ONU housing 962. The ONU housing houses an AC/DC converter 964 which receives the AC from port 960 and outputs (a) DC voltage(s) at (an) appropriate magnitude(s) for supply 968 to circuits in the ONU 918 requiring power.

The A/D converter 951 receives the RF converter signal from the optical fiber coupled to connector 914, which may include instructions from the head end (not shown) of the cable provider. These are digitized by A/D 951 and provided to FPGA 953 to control, via connections 969, 6 db attenuator switches 967-1-967 and disconnect switches 939-1-939-4. In that way, the FPGA 953 acts as a control circuit for the ONU 818 that is configured to both test the upstream and downstream signals paths and operate one or more switches to adjust those signals or (in the case of the upstream signals) prevent their transmission to the rest of the cable network. For example, the head end may provide instructions to operate the switch 955 to selectively monitor the noise signal from each of the directional couplers 936-1-936-4 and hence the noise produced by each premises connected to each of the couplers. Based on the noise level, the FPGA 953 (on its own or in response to instructions from the head end) generates one or more signals to operate the attenuator switches 947-1-947-4 and/or disconnect switches 939-1-939-4 to isolate the noise source. It should also be appreciated that the FPGA 953 may be programmed to continuously or periodically monitor the noise signal from each of the directional couplers 936-1-936-4 and selectively operate the attenuator switches 947-1-947-4 and/or disconnect switches 939-1-939-4 to isolate the noise source based on the noise levels.

As shown in FIG. 11, WDM 915 is coupled to a GPON SFP transceiver 972 providing monitoring of the status of ONU 918 and subscriber equipment coupled to RF input/output ports 934-1-934-4. Again in this embodiment, the optical signal at port 914 is also passed through splitter/combiner 916 to a passthrough input/output port SC/APC optical fiber connector 970 for coupling to other ONUs in series.

Figure 12A:
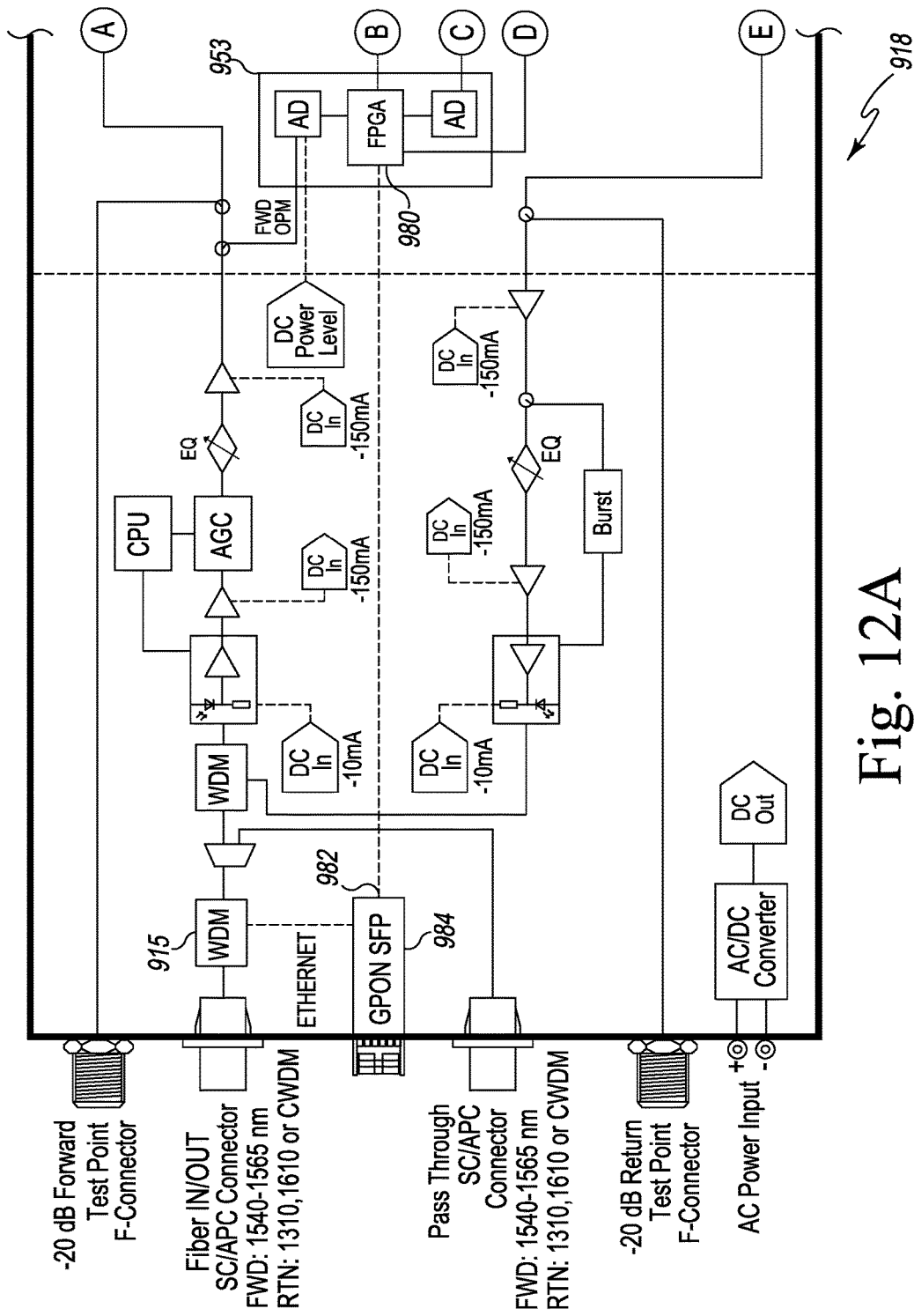
Figure 12B:
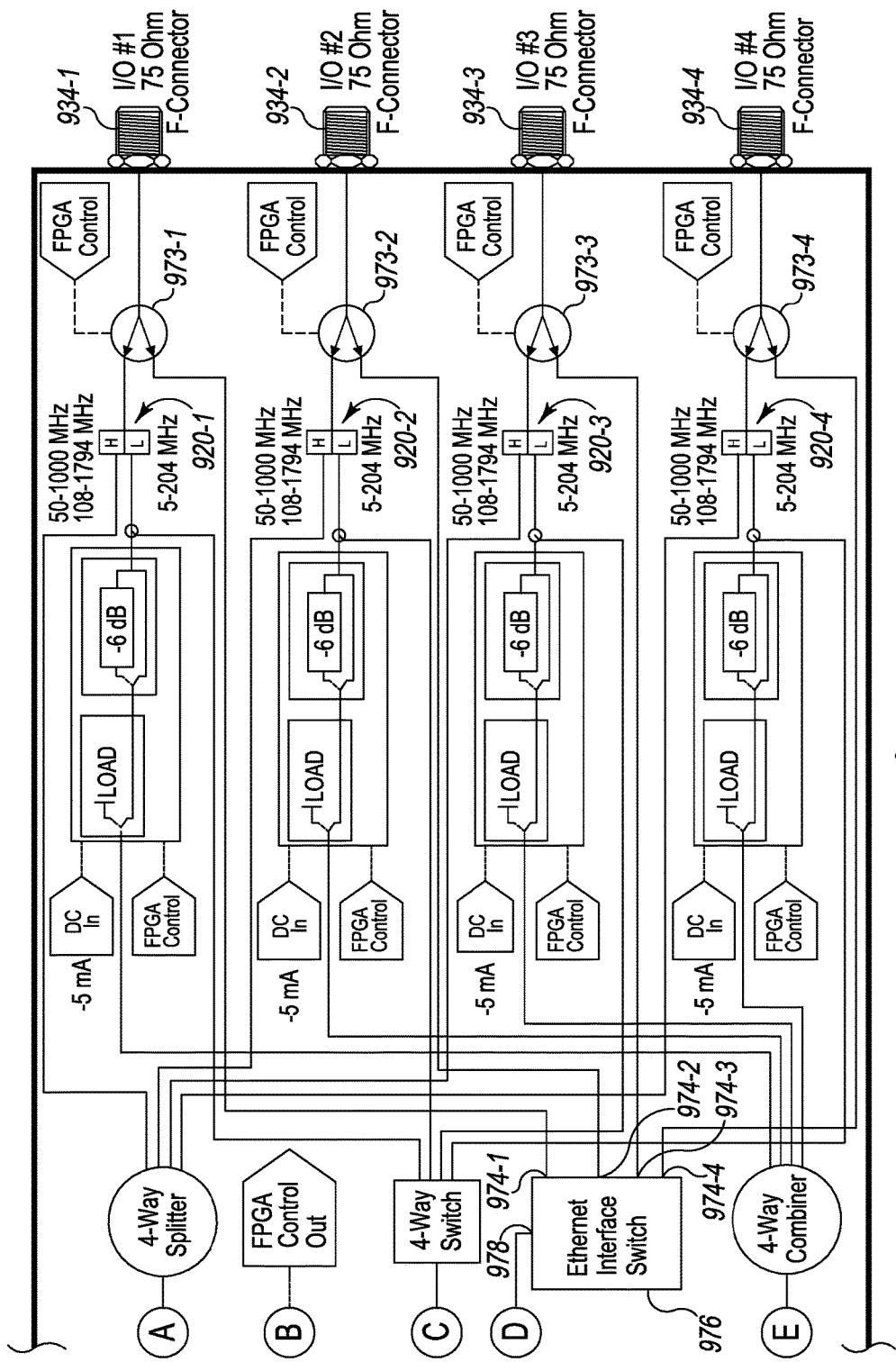

With reference to FIG. 12, an embodiment like the embodiment illustrated in FIG. 11, but with additional features, is illustrated. Except as otherwise described hereinafter, the circuit illustrated in FIG. 12 is as illustrated and described in connection with FIG. 11. In FIG. 12, a single fiber ONU with power, four input/output ports to subscribers' premises and return monitoring logic also includes an IP network-ready feature. To implement this feature, the embodiment illustrated in FIG. 12 includes respective FPGA 953—controlled switches 973-1-973-4 in series between respective RF input/output ports 934-1-934-4 and the respective diplex filters 920-1-920-4. One input/output port of each switch 973-1-973-4 is coupled to an input/output port of a respective diplex filter 920-1-920-4. Another input/output port of each switch 973-1-973-4 is coupled to a respective input output port 974-1, 974-2, 974-3, 974-4 of an Ethernet interface switch 976. Another input/output port 978 of switch 976 is coupled to FPGA 953. An input/output port 980 of FPGA 953 is coupled to an input/output port 982 of a GPON/EPON 984, an additional input/output port of which is coupled to WDM 915.

The illustrated systems provide the cable system operator the versatility to connect with RF, expandable to Ethernet, to the subscriber premises from the premises exterior, a pedestal at the curb, or from aerial applications. Depending upon unit configuration, the unit may serve one to eight premises (one and four are illustrated in the various embodiments) from one distribution point. The unit may receive power from the premises in applications where a premises is serviced by a unit mounted on, for example, the exterior wall of the premises, or from power cables imbedded in the fiber optic cable when the unit is mounted, for example, in a pedestal or aerial. The unit may also contain an AC/DC converter to supply DC voltage to the unit's active components. The illustrative units operate with 1550 nm downstream and either 1310 nm or 1610 nm upstream, one- or two-fiber applications. Communications wavelength through onboard SFP illustratively is 1625 nm.

Each unit contains circuitry designed to give Preventative Network Maintenance (PNM) coverage of the return band and other significant operating parameters to assure proper operation of the bilateral network. The unit may include:

1. Port level Return Path Monitoring: Continuously monitors the return path at the point of entry. This monitoring includes level, spurious, noise, ingress and other phenomena. Upon detection and evaluation of the severity of an anomaly, the unit may attenuate or disconnect the affected port and notify the cable system operator that a malfunction exists and provide the operator the characteristics of the malfunction. The unit may continue to monitor the affected port and reinstate normal operation if the malfunction is cured. Monitoring characteristics are downloaded to the unit from central office software, permitting the unit to run without operator or system intervention.

2. Receive Level Fiber Optic Power: Continuously monitors fiber optic power levels, recording any change.

3. Input Voltage Levels: Monitors input voltage levels, recording any changes from initial integration of the unit. This may be useful in resolving the locations of short circuits and open circuits in the integrated optic and power cabling.

4. Monitors and Adjusts ONU: Unit monitors and adjusts optical receive diodes, laser transmitter, and RF levels in the ONU portion of the unit.

5. Normalized Wavelength Optical Transmission over Temperature: Unit is calibrated over a wide temperature range and automatically adjust output wavelength relative to temperature by interrogating a temperature probe, referring to a lookup table, and adjusting the output wavelength by varying the bias and RF input levels.

Optional circuitry in the unit permits software-implemented IP to the home through Ethernet Over Cable (EOC). By coupling transmission lines from the FPGA to each port of the RF input/output through switches, the FPGA can be transformed into an Ethernet router supplied by the SFP and serving each home as dictated by central office programming A second Ethernet router with Ethernet cable in to Category 5 and 6 (Cat5&6) out would be connected in the home to provide data, video, security, phone and wireless (WIFI) services.

Because the service provider will know exactly where malfunctions are occurring, the unit thus has the potential to reduce cable system operating expenses. Because of the ability to instantly reduce the levels of any harmful ingress into the system or completely disconnect the ingress source from the system until repair can be effected, the unit has the potential to increase subscriber satisfaction. Current PNM solutions monitor only the forward path. The unit permits the service provider to monitor both the forward and return paths, thereby providing a more complete monitoring solution. The unit has the potential to eliminate the need for headend-based monitoring by embedding measurements within ONUs in the field. The unit provides the system operator with a real-time view of both the forward path and the return path to/from the subscriber's premises.

The embodiments illustrated in FIGS. 10 and 12 add the ability to individually switch users from RFoG (DOCSIS format) to IP format by direction from central office software. When implemented, the operator can migrate or upgrade subscribers from RFoG to IP service. The signals will bilaterally transfer from/to the optical to electronic converter (GPON/EPON). The I/O of the converter is coupled to the FPGA. The FPGA strips from the data stream signals intended for the circuitry illustrated and described in connection with FIGS. 9 and 11, and passes any Ethernet traffic to the Ethernet interface switch. Under direction of the FPGA, the Ethernet interface switch permits traffic, via 75Ω switches, on the port(s) to the subscriber(s). Again, the FIG. 10 or 12 device may be a one-, two-, four- or eight-port device. Ethernet speeds are in the gigabit range. In the subscriber's premises, an EOC (Ethernet over Cable) interface converts the 75Ω Ethernet signals to Cat 5&6 cables or WIFI. The concept of Ethernet switching can be configured as a stand-alone or used with any of the previously described devices. Product hardware configurations permit premises, pedestal, or aerial (pole) applications. Power is supplied form the premises or from conductor(s) embedded in the fiber bundles. The 75Ω switch may also be used as a disconnect switch when connected to an Ethernet transmission line with no signals authorized by the FPGA.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure as defined by the appended claims.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There is a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A dual fiber optical network unit (ONU) apparatus comprising:
a fiber connector,
a number of RF input/output ports, a number of n diplex filters, each diplex filter having an upper passband and a lower passband, a downstream path including:
an optical-to-RF converter/optical receiver optically connected to the fiber connector,
the number of RF input/output ports,
the upper passband of each diplex filter of the number of n diplex filters, wherein the upper passband of each diplex filter of the number of n diplex filters is coupled to a respective RF input/output port of the number of RF input/output ports, and
an n-way RF splitter including (i) an input port coupled to an output port of the optical-to-RF converter/optical receiver and (ii) a number of output ports, each output port being coupled to the upper passband of a respective diplex filter of the number of n diplex filters, and an upstream or return path including:
the number of RF input/output ports,
an n-input combiner,
the lower passband of each diplex filter of the number of n diplex filters, wherein the lower passband of each diplex filter of the number of n diplex filters is coupled to (i) a respective RF input/output port of the number of RF input/output ports and (ii) an input port of the n-input combiner,
a return path RF-to-optical converter or optical transmitter connected to the n-input combiner, and
the fiber connector optically connected to the return path RF-to-optical converter or optical transmitter, wherein n is an integer equal to the number of RF input/output ports.

2. The apparatus of claim 1, further comprising a number of switched attenuators, each switched attenuator being electrically positioned between a respective diplex filter of the number of n diplex filters and the n-input combiner such that each switched attenuator has an input port coupled to the lower passband of a respective diplex filter and an output port coupled to an input port of the n-input combiner.

3. The apparatus of claim 2, further comprising a number of switches, each switch being positioned between a respective switched attenuator and a respective input port of the n-input combiner, and each switch having an input port connected to the output port of its respective switched attenuator and an output port coupled to the respective input port of the n-input combiner.

4. The apparatus of claim 3, further comprising a control circuit that includes a Field Programmable Gate Array (FPGA) configured to receive and digitize instructions via an input port of the dual fiber optical network unit apparatus, wherein the FPGA is configured to control the number of switched attenuators, and wherein the number of switches are coupled to the FPGA based on signals received from a cable signal source.

5. The apparatus of claim 1 further comprising a Wavelength Division Multiplexer (WDM) coupled to the fiber connector, and
a Passive Optical Network (PON) transceiver coupled to the WDM for monitoring of the status of the ONU and any subscriber equipment coupled to any of the RF input/output ports.

6. The apparatus of claim 1 further including:
a burst circuit, and
a directional coupler having an input port coupled to an output of the n-input combiner, a first output port coupled to the return path RF-to-optical converter or optical transmitter, and a second output port coupled to an input port of the burst circuit, the burst circuit being configured to compare a signal from the directional coupler to a threshold and enable the return path optical transmitter when the signal from the directional coupler reaches or exceeds the threshold to pass data upstream from a subscriber coupled to the RF input/output port.

7. The apparatus of claim 1, further including a connector for supplying power to the ONU.

8. The apparatus of claim 1 further including an automatic gain control (AGC) circuit electrically positioned between the optical-to-RF converter/optical receiver and the input port of the n-way RF splitter.

9. An apparatus comprising:
a housing,
a fiber connector coupled to the housing,
a number of RF input/output ports coupled to the housing, and
a number of electrical components positioned in the housing, the number of electrical components comprising:
(i) an optical-to-RF converter/optical receiver electrically connected to the fiber connector,
(ii) a signal splitter electrically connected to, and configured to receive signals from, the optical-to-RF converter/optical receiver,
(iii) a first diplex filter electrically connected to a first RF input/output port of the number of RF input/output ports, the first diplex filter including a lower passband and an upper passband that is electrically connected to a first output port of the splitter,
(iv) a second diplex filter electrically connected to a second RF input/output port of the number of RF input/output ports, the second diplex filter including a lower passband and an upper passband that is electrically connected to a second output port of the splitter,
(v) a signal combiner having a first input port that is electrically connected to the lower passband of the first diplex filter and a second input port that is electrically connected to the lower passband of the second diplex filter, and
(vi) a RF-to-optical converter or optical transmitter electrically connected to an output port of the signal combiner and the fiber connector.

10. The apparatus of claim 9, wherein the number of electrical components further comprise:
a first switched attenuator electrically positioned between the first diplex filter and the first input port of the signal combiner such that the first switched attenuator has an input port coupled to the lower passband of the first diplex filter and an output port coupled to the first input port of the signal combiner, and
a second switched attenuator electrically positioned between the second diplex filter and the second input port of the signal combiner such that the second switched attenuator has an input port coupled to the lower passband of the second diplex filter and an output port coupled to the second input port of the signal combiner.

11. The apparatus of claim 10, wherein the number of electrical components further comprise:
a first switch electrically positioned between the first switched attenuator and the first input port of the signal combiner, the first switch being operable to selectively connect the first switched attenuator to the first input port of the signal combiner, and
a second switch electrically positioned between the second switched attenuator and the second input port of the signal combiner, the second switch being operable to selectively connect the second switched attenuator to the second input port of the signal combiner.

12. The apparatus of claim 11, wherein the number of electrical components further comprise a control circuit configured to operate the first and second switches based on signals received from a cable signal source.

* * * * *